US012614896B2

(12) United States Patent
    Harvey et al.

(10) Patent No.: US 12,614,896 B2
(45) Date of Patent: Apr. 28, 2026

(54) MOUNTING A ROBOTIC ARM IN AN INVERTED POSITION TO SUSPEND AN ELECTRICAL BYPASS

(71) Applicant: Quanta Associates, L.P., Houston, TX (US)

(72) Inventors: Benjamin James Harvey, Burnaby (CA); Jeremy Dennis Baker, Rupert, ID (US); Daniel Neil O'Connell, Burnaby (CA); Raymond Henry Jodoin, Burnaby (CA)

(73) Assignee: Quanta Associates, L.P., Houston, TX (US)

( * ) Notice: Subject to any disclaimer, the term of this patent is extended or adjusted under 35 U.S.C. 154(b) by 912 days.

(21) Appl. No.: 17/186,721

(22) Filed: Feb. 26, 2021

(65) Prior Publication Data

US 2021/0273424 A1     Sep. 2, 2021

Related U.S. Application Data

(60) Provisional application No. 62/983,092, filed on Feb. 28, 2020.

(30) Foreign Application Priority Data

Feb. 28, 2020    (CA) ................................ CA 3074146

(51) Int. Cl.
    *H02G 1/04*          (2006.01)
    *B66C 1/68*          (2006.01)
    (Continued)

(52) U.S. Cl.
    CPC ................. *H02G 1/04* (2013.01); *B66C 1/68* (2013.01); *B66C 23/04* (2013.01); *B66C 23/42* (2013.01);
    (Continued)

(58) Field of Classification Search
    CPC .. H02G 1/04; B66C 1/68; B66C 23/04; B66C 23/42; B66C 23/702; B66C 2700/0378; B25J 18/02; B25J 18/04; B25J 18/025
    (Continued)

(56) References Cited

U.S. PATENT DOCUMENTS 4,466,506 A      8/1984  Dolenti
5,538,207 A  *   7/1996  O'Connell ............... H02G 1/04
                                                          182/2.11

(Continued)

OTHER PUBLICATIONS

Ruppert, Christopher, Supplementary European Search Report for EP 21 761 407.2, Jun. 28, 2023, 9 pages, European Patent Office, Munich, Germany.

(Continued)

*Primary Examiner* — Brian D Keller
*Assistant Examiner* — Jason Khalil Hawkins
(74) *Attorney, Agent, or Firm* — Oathout Law Firm; Antony C. Edwards; Laura Tu

(57)          ABSTRACT

A method and apparatus to invert a robotic arm, includes an angling adaptor and swing arm. The angling adaptor includes a truck or crane boom head adaptor and a hinge coupler. The swing arm extends downwardly from the angling adaptor and may include a boom adaptor arm and a jib. The lower end of the swing arm is mounted to the main beam of the robotic arm. The hinge coupler mounts to the upper end of the crane or truck boom. The robotic arm is mounted on the swing arm so as to downwardly orient the insulators on the robotic arm. A lowermost end of each insulator is adapted for releasably holding an electrical bypass which may include a bus bar and electrical cable jumpers.

30 Claims, 22 Drawing Sheets

(51) Int. Cl.
*B66C 23/04* (2006.01)
*B66C 23/42* (2006.01)
*B66C 23/70* (2006.01)

(52) U.S. Cl.
CPC .... *B66C 23/702* (2013.01); *B66C 2700/0378* (2013.01)

(58) Field of Classification Search
USPC ........................ 254/134.3 R, 134.5, 134.3 PA
See application file for complete search history.

(56) References Cited

U.S. PATENT DOCUMENTS

| | | | | |
|---|---|---|---|---|
| 8,226,069 | B2 | 7/2012 | Devine et al. | |
| 8,585,020 | B2 | 11/2013 | Devine et al. | |
| 8,684,333 | B2 * | 4/2014 | Devine | H02G 1/04 |
| | | | | 182/2.1 |
| 9,038,989 | B2 | 5/2015 | Devine et al. | |
| 9,203,219 | B2 * | 12/2015 | Devine | H02G 1/04 |
| 9,938,117 | B2 * | 4/2018 | Fritel | B66C 1/10 |
| 2003/0156936 | A1 | 8/2003 | Devine et al. | |
| 2008/0166212 | A1 * | 7/2008 | Hested | F15B 21/047 |
| | | | | 414/618 |
| 2009/0095522 | A1 | 4/2009 | Barthold | |
| 2014/0097302 | A1 | 4/2014 | Musselman | |
| 2015/0030426 | A1 | 1/2015 | Fritel et al. | |

OTHER PUBLICATIONS

Thomas, Shane, International Search Report and Written Opinion of the International Searching Authority for PCT/US21/19892, May 7, 2021, 6 pages, ISA/US, Alexandria, Virginia, United States of America.

Cofre, Jose Anibal Dinamarca, Resolution of notification of the expert report (new law) for Patent of Invention PCT / 2022-02343, Dec. 19, 2023, 20 pages, National Institute of Industrial Property—INAPI, Santiago, Chile.

Cofre, Jose Anibal Dinamarca, Notification Resolution of an Expert Opinion for PCT Patent Application / 2022-02343, Jun. 10, 2024, 23 pages, National Institute of Industrial Property—INAPI, Santiago, Chile.

* cited by examiner

MOUNTING A ROBOTIC ARM IN AN INVERTED POSITION TO SUSPEND AN ELECTRICAL BYPASS

FIELD OF THE DISCLOSURE

This disclosure relates to a method and apparatus for downwardly canting a boom adaptor arm from the upper end of a truck or crane boom so as to position an inverted robotic arm mounted on the end of the boom adaptor arm and an electrical bypass apparatus mounted on the robotic arm over an electrical component needing maintenance or replacement.

BACKGROUND OF THE DISCLOSURE

Robotic arms for temporarily supporting live conductors are known in the prior art. For example applicant is aware of U.S. Pat. Nos. 5,538,207, 8,226,069, 8,585,020, 9,038,989, 8,684,333, and 9,203,219, incorporated herein by reference, which describe robotic arms known in the industry as LineMaster™ robotic arms. LineMaster robotic arms typically include a telescoping linear beam on which are mounted upstanding station class electrical insulators to temporarily support the phases of high voltage live conductors. The robotic arm may be mounted on the end of a truck or crane boom, for example, using a boom adaptor mounted on the end of the boom. The main beam of the robotic arm is electrically insulated from the crane with a fiberglass or otherwise non-electrically conductive section or jib, collectively referred to herein as a jib, mounted to the boom adaptor. The live conductors are electrically insulated from the beam by the upstanding insulators. An actuator cooperates between the main beam and the boom adaptor, for example by means of a direct linkage or a scissor linkage, to rotate the main beam between a horizontal position and a vertically upright position. The insulators are typically at 90 degrees to the beam, although in some embodiments the insulators on the ends of the beam may be inclined outwardly of the beam, for example at 45 degrees. Rotating the main beam also rotates the upstanding insulators between their vertically upstanding position when the beam is horizontal, and a horizontal position when the beam is vertical.

Using a LineMaster™ robotic arm, when it is desired to, for example, replace a powerline structure or insulators, in one method the conductor phases are picked up by the corresponding insulators on the robotic arm and lifted a required distance away from their original position. The picking up of the conductor phases may be done whether the phases are arranged horizontally relative to one another or are arranged vertically relative to one another as the LineMaster™ robotic arm may be rotated into the corresponding orientation.

Because the range of travel of the LineMaster™ robotic arm is only between substantially vertical and horizontal, the robotic arm cannot, without conversion to add a new structure or to change the existing structure, be inverted so as to extend the insulators on the robotic arm downwardly. Inverting the robotic arm so as to position the insulators downwardly and above an energized electrical component such as a switch when it is desired to bypass the electrical component for maintenance or repair provides advantages where for example an electrical bypass can only be positioned, or is best or most efficiently positioned above the electrical component, for example because of the energized electrical component to be bypassed being close to the ground, or otherwise limited working clearances, or minimum approach distances.

In the prior art of which applicant is aware, cranes have been used to lower bus bars or the like into position to allow bypassing switches and associated jumper cables, or other electrical components. This however has the drawback that the crane cable allows a beam carrying the bus bars or the like to rotate, causing the supported bus bars to possibly contact each other, which then requires stabilization of the beam, for example by the use of multiple bucket trucks and corresponding multiple personnel. If more than one switch is being bypassed, as is the case where there are multiple phases, the switches have to open and close simultaneously, requiring the use of a beam suspended on the crane cable, where the beam carries multiple bus bars or like electrical bypassing equipment. The apparatus disclosed herein precludes the rotating of the beam ordinarily associated with the use of a crane, as an inverted robotic arm is used in place of a beam underslung from a crane. A boom adapter arm mounted to the end of the crane or truck boom is used to both advantageously securely position the inverted robotic arm and to provide required spacing and working clearance between the boom and the energized conductors over which the robotic arm is positioned.

SUMMARY OF THE DISCLOSURE

The apparatus according to the present disclosure is for mounting a robotic arm in an inverted position to suspend an electrical bypass for bypassing electrical components such as for example switches, breakers or conductor double dead-ends which are difficult to change. The robotic arm is preferably a LineMaster™ robotic arm or substantial equivalent thereof, for example a robotic remotely controlled beam which is adapted to mount onto the upper end of crane or truck boom by means of a swing arm such as the combination of a boom adaptor arm and jib, and is remotely controllable to position the beam relative to the boom so as to position downwardly extending electrical insulators mounted along the beam.

The apparatus according to the present disclosure may include, in one aspect: (a) a releasably lockable hinge coupler having a pivot linkage, wherein said hinge coupler is adapted for mounting to a free end of a crane or truck boom, and wherein in a normal operating orientation the boom may have a range of motion sweeping an angular orientation between substantially horizontal and substantially vertical; (b) an elongate, directionally reversible boom adapter arm having opposite first and second ends, wherein the first end of said boom adapter arm is pivotally mounted on the pivot linkage for releasably lockable pivoting about the pivot linkage relative to the hinge coupler, whereby said boom adapter arm is selectively orientable relative to said crane or truck boom between a downwardly oriented operational position relative to the boom and an in-line transport position substantially in-line with the long axis of the boom, (c) a robotic arm jib, wherein the second end of the boom adapter arm is mounted to a first end of the robotic arm jib so as to collectively, with the boom adapter arm, form an elongate swing arm. The opposite second end of the swing arm is coupled to the selectively positionable robotic arm.

The robotic arm has at least one, and preferably a plurality of downwardly extending elongate electrical insulators mounted therealong so as to depend downwardly from the robotic arm in oppositely disposed relation to the boom adapter arm and jib relative to the robotic arm. The lowermost free ends of the electrical insulators are adapted to each releasably hold an electrically energized electrical bypass such as a bus bar. Electrical cables may be electrically connected to opposite ends of the bus bar. In operation the bus bar and cables are positionable over, and electrically connectable around, so as to electrically bypass, an energized electrical component for servicing or replacement of the electrical component once de-energized.

In one embodiment, not intended to be limiting, an actuator cooperates between the robotic arm jib and the robotic arm for selective rotation of the robotic arm relative to the boom adapter arm and robotic arm jib. Advantageously a crane or truck boom adaptor is mountable between the crane or truck boom and the hinge coupler. The hinge coupler may include a housing, mountable to the boom adaptor, supporting the pivot linkage. The pivot linkage may include a pin mounted through the housing, wherein the first end of the boom adapter arm pivots about the pin and the boom adapter arm extends downwardly from the housing.

In its operational position the boom adapter arm and robotic arm jib, collectively herein alternatively referred to as being one embodiment of the swing arm, are selectively orientable downwardly relative to a long axis of the crane or truck boom so as to form an included angle between the boom and the boom adapter arm in the range of 60-120 degrees. The swing arm may be at least substantially 12 feet long. The swing arm and the robotic arm advantageously lie substantially in a common plane so that the robotic arm is positionable by the actuator so as to rotate the robotic arm in the common plane.

In embodiments, the range of the included angle may be less than 60-120 degrees, for example 75-105 degrees, or for example substantially 90 degrees. The swing arm may be substantially linear. In embodiments where the swing arm includes a boom adaptor arm and a jib, the boom adaptor arm and the jib may be of substantially equal length.

A method of using the apparatus according to the present disclosure for mounting a robotic arm in an inverted position to suspend an electrical bypass for bypassing electrical components, in one embodiment may include the steps of:

a) with the crane or truck boom retracted and lowered, mounting the hinge coupler onto the end of the boom and mounting the swing arm onto the hinge coupler, b) adjusting the angle of the swing arm into its operational position relative to the boom, and mounting the inverted robotic arm to the free end of the swing arm so that the insulators on the robotic arm depend downwardly, c) coupling the lower ends of the insulators to corresponding electrical bypasses, d) elevating the boom, swing arm, robotic arm and electrical bypasses mounted there under so as to position the bypasses over electrical components needing repair or maintenance, e) connecting the bypasses so as to electrically bypass the electrical components, f) de-energizing the electrical components for repair, maintenance or replacement.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DETAILED DESCRIPTION

Figure 1:
FIG. 1 is, in perspective view, an inverted LineMaster™ robotic arm mounted on the lower end of a downwardly inclined boom adapter arm which is pivotally mounted to a crane or truck boom head adapter, showing three parallel electrical bus bars held underneath the robotic arm on the end of downwardly extending electrical insulators.

The description that follows includes exemplary apparatus, methods, techniques, and instruction sequences that embody techniques of the inventive subject matter. However, it is understood that the described embodiments may be practiced without these specific details.

In order to invert a robotic arm such as a LineMaster™ robotic arm which is typically used with station class electrical insulators, the uppermost end of a boom such as a crane or truck boom, on which the robotic arm is mounted, is adapted to allow reorientation of the robotic arm so as to invert it. A hinge coupler and boom adapter arm to reorient the robotic arm relative to the long axis of the crane or truck boom are therefore provided. The hinge coupler and crane or truck boom adaptor connect the boom adapter arm to the crane or truck boom. The swing arm, which extends downwardly from the hinge coupler, may include a boom adaptor arm and an electrically insulated robotic arm jib. The lower end of the swing arm is mounted to the main beam of the robotic arm. The hinge coupler is advantageously releasably lockable and may include a pivot linkage. The hinge coupler is adapted for mounting to the crane or truck boom adapter on the upper, free end of the crane or truck boom. In one example the crane or truck boom is retractable and extendable, and may be rotated about its base between substantially horizontal and substantially vertical positions. The crane or truck boom may be mounted on the back of a flatbed truck. As would be known to those skilled in the art, other forms of booms may also be used.

The swing arm may for example include the elongate, directionally reversible boom adaptor arm mounted end-to-end to the robotic arm jib. A first, upper end of the swing arm is pivotally mounted on the pivot linkage in the hinge coupler for releasably lockable pivoting of the swing arm about the pivot linkage relative to the free end of the crane or truck boom. The swing arm is thereby selectively orientable relative to the crane or truck boom between a downwardly oriented operational position relative to the crane or truck boom within an angular range better described below and an in-line position substantially in-line with the long axis of the crane or truck boom. The in-line position is useful for transportation of the boom adapter arm and robotic arm. The second, lower, end of the swing arm is mounted to a selectively positionable elongate robotic arm such as a LineMaster™ robotic arm.

The robotic arm is mounted upside down on the second end of the swing arm so as to downwardly orient the insulators mounted on the robotic arm. For example, for use on live conductors of three phase AC circuit, the robotic arm will advantageously have three correspondingly spaced apart insulators. The insulators may be station class insulators. The robotic arm may also be used for live DC conductors, in which case the robotic arm will have at least one, and likely two, downwardly extending insulators extending downwardly therefrom. When the insulators are oriented downwardly they may be described as being in oppositely disposed in relation to the main beam of the robotic arm; that is, on opposite sides of the robotic arm. A lowermost free end of each insulator is adapted for releasably holding an electrically energized electrical bypass which may include a rigid bus bar.

An actuator cooperates between the swing arm and the robotic arm for selective rotation of the robotic arm relative to the swing arm while the robotic arm is inverted. This is useful if for example the robotic arm is holding, suspended beneath it, a bus bar for electrically bypassing an electrical component needing repair or maintenance, such as a switch. The electrical component may be at a relatively low height above ground or may be significantly elevated such as on a pole structure or tower. The bus bar, which may for example be a metal, such as aluminum, bar, is suspended below the robotic arm on the electrical insulators depending downwardly from the robotic arm. In use then, the robotic arm is first lowered to for example the level of the truck and the bus bars are connected to the lowermost ends of the insulators on the robotic arm. Because the bus bars are being used to bypass elevated electrical components, such as switches, jumper cables or the like are connected to either end of each bus bar for attachment to the corresponding conductors which are connected on opposite sides of the electrical component requiring maintenance.

With the swing arm fixed in its position angled downwardly from the end of the crane or truck boom, and with the bus bars and jumper cables mounted under the robotic arm and otherwise ready for use, the robotic arm is raised by extension of the crane or truck boom and the boom oriented to position the robotic arm and bus bars over the electrical component. The robotic arm and boom orientation is adjusted using the robotic arm's actuator and the boom actuator on the truck so that the bus bars are in their operative position, for example, parallel with the long axes of each switch and their corresponding conductors which extend from each switch. The crane or truck boom is then used to lower the bus bars until the jumper cables can be electrically connected to the conductors so as to affect the bypass of each switch.

Once the repair, maintenance or replacement of the electrical apparatus or switches has been done, the jumper cables may be removed and the robotic arm and the bus bars lifted out of the way. The robotic arm and bus bars may then be returned to the ground or truck-level to have the bus bars removed from the robotic arm for transport, or the whole system may be moved to an adjacent work site for the repair, maintenance or replacement of other electrical components. If the bus bars are removed so that the robotic arm and boom can be transported, the crane or truck boom is retracted and lowered onto the boom rest, the swing arm is rotated on the hinge coupler so as to be in-line with the end of the crane or truck boom, and the robotic arm is articulated into a position convenient for transportation or for removal from the end of the swing arm.

In one embodiment, not intended to be limiting, the hinge coupler supports the pivot linkage. The hinge coupler is mountable to a crane or truck boom adaptor, for example a crane boom adaptor in the case of a crane boom, mounted onto the free end of the boom. The pivot linkage may include a pin or other hinge mechanism mounted through or in the hinge coupler. The first end of the boom adapter arm pivots about the pin or other hinge mechanism so as to allow the boom adapter arm to rotate downwardly so that it extends inclined downwardly from the hinge coupler, and thus is inclined downwardly from the end of the crane or truck boom.

The particular hinge coupler illustrated, which again is not intended to be limiting, has side walls having locking-pin receiving holes therein arrayed in an arc about the pivot linkage and the boom adapter arm has a locking-pin aperture to receive a locking pin therein. The boom adapter arm is thus pivotable about the pivot linkage so as to align a selected one of the locking pin receiving holes in the hinge coupler with the locking pin aperture in the boom adapter arm. The locking pin is inserted through the desired locking pin receiving hole in the hinge coupler side walls and locking pin aperture in the boom adapter arm to thereby lock the orientation of the boom adapter arm relative to the hinge coupler. In the illustrated examples the boom adapter arm may be locked so as to extend at 90 degrees from the hinge coupler. The angle may be adjusted so that the boom adapter arm is offset by 15 degrees on either side of the 90 degree orientation.

When in its operational position the crane or truck boom may be inclined upwardly at approximately 45 degrees for example, and the boom adapter arm downwardly inclined at between about 75 degrees and 105 degrees (measured as the included angle between the crane or truck boom and the upper end of the boom adapter arm). In other embodiments the boom adapter arm may be selectively orientable downwardly relative to the crane or truck boom through a wider angular range of motion.

In one preferred embodiment the swing arm is for example substantially 12 feet long and may consist of two components; an elongate boom adaptor arm closest to the hinge coupler and the robotic arm jib extending from the boom adaptor arm to the robotic arm.

Advantageously the swing arm and the robotic arm lie substantially in a common plane, and the actuator rotates the robotic arm in that common plane. In further embodiments the actuator or a further actuator (not shown) rotates the robotic arm out of the common plane. The actuator may include a hydraulic cylinder acting between the robotic arm jib and the robotic arm, and may also include a scissor linkage for increased angular range of motion of the robotic arm.

Figure 6:
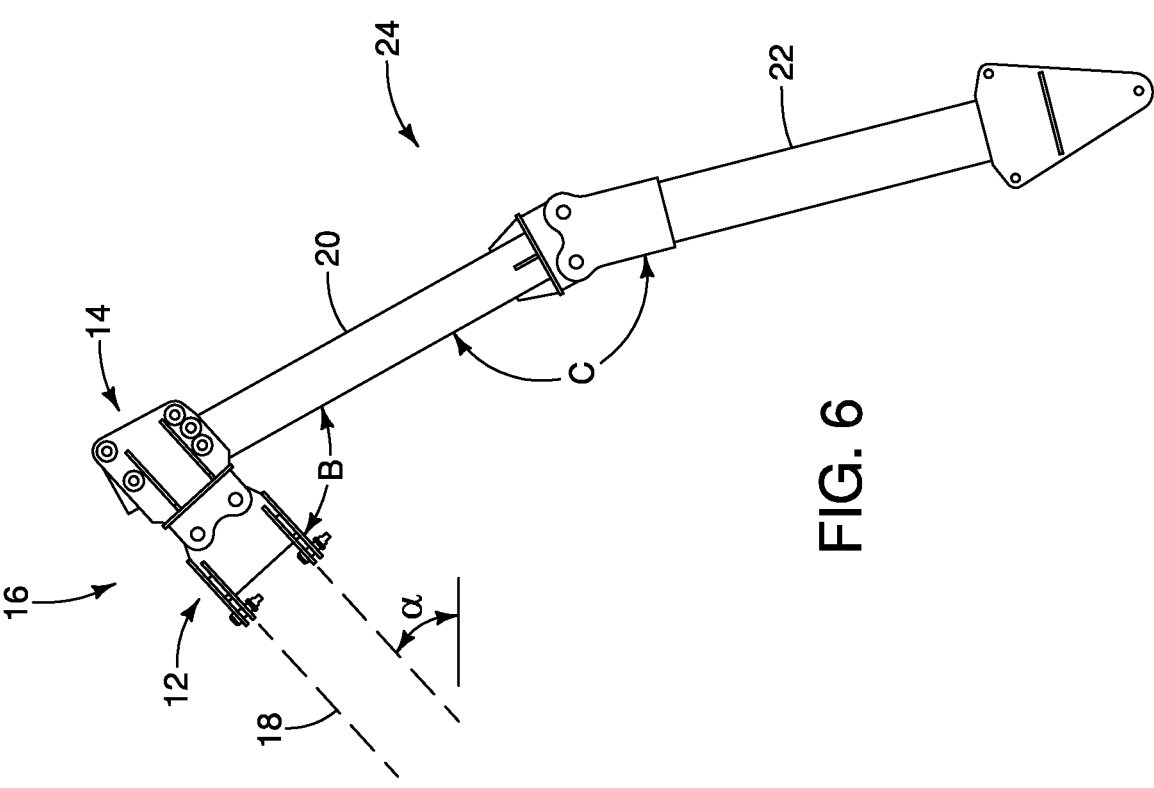
FIG. 6 is, in side elevation view, the crane or truck boom head adapter and swing arm of FIG. 5. The crane or truck boom is illustrated angled upwardly at 45 degrees.
Figures 7, 8:
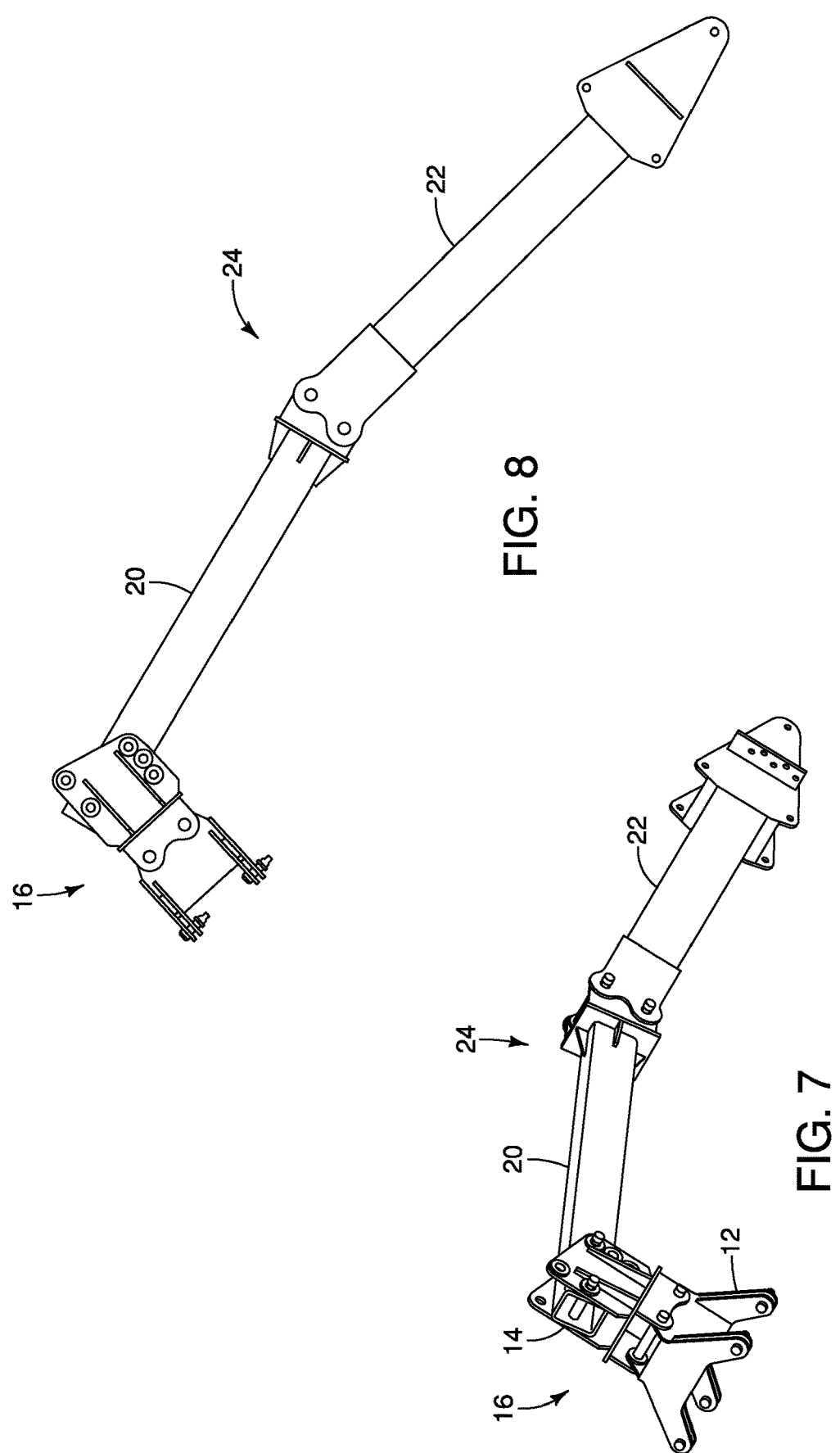
FIG. 7 is the perspective view of FIG. 5 showing the boom adapter arm inclined 15 degrees off 90 degrees relative to the crane or truck boom head adapter so as to rotate the swing arm 15 degrees away from perpendicular to the main boom.
FIG. 8 is the swing arm and crane or truck boom head adapter of FIG. 7 shown in side elevation view.

As seen in FIG. 1, the inverted robotic arm system 10 includes a crane or truck boom adapter 12 mounted to a hinge coupler 14, which collectively form an angling adapter 16. Crane or truck boom adapter 12 mounts onto the uppermost end of crane or truck boom 18. Boom 18 is, in operation, angled upwardly by angle alpha ($\alpha$) relative to the horizontal. As seen in FIG. 6, wherein boom 18 is shown in dotted outline, angle alpha may for example be about 45 degrees. A boom adapter arm 20 is pivotally mounted to hinge coupler 14 so as to depend downwardly therefrom, and in particular, so as to form an included angle beta (B), seen in FIG. 6, between boom adapter arm 20 and crane or truck boom 18. A robotic arm jib 22 is mounted to the lowermost end of boom adapter arm 20 so as to extend approximately linearly therefrom. Collectively, boom adapter arm 20 and robotic arm jib 22 form swing arm 24.

Robotic arm jib 22 may be mounted in-line with boom adapter arm 20 or, as illustrated, may be angled slightly further downwardly relative to boom adapter arm 20 so as to form an included angle C of for example approximately 165 degrees, again as seen in FIG. 6. A robotic arm 26 is pivotally mounted to the lowermost end of robotic arm jib 22 for rotation in a plane, referred to herein as the common plane, which includes swing arm 24 and robotic arm 26. An actuator such as hydraulic cylinder 28 is mounted so as to cooperate between robotic arm jib 22 and robotic arm 26 so as to selectively angularly position robotic arm 26 relative to robotic arm jib 22.

In one embodiment, not intended to be limiting, robotic arm 26 may be a Linemaster™ robotic arm having a main beam 26a pivotally mounted to robotic arm jib 22, and having selectively extendable telescopic arms 26b extending telescopically and linearly from opposite ends of main beam 26a. In the illustrated example, not intended to be limiting, three station class electrical insulators 30 are mounted so as to depend downwardly from robotic arm 26. In particular, one insulator 30 extends downwardly from either end of extendable telescopic arms 26b and a third insulator 30 extends downwardly from a position midway along main beam 26a. Rigid bus bars 32 are mounted to the lowermost ends of insulators 30, midway along the length of the bus bars. In this fashion, when the system 10 of FIG. 1 is mounted onto the upper end of a crane or truck boom 18, system 10 may be positioned over electrical components such as electrical switches 34, seen commencing in FIG. 20, so as to repair, maintain or replace the electrical component. In a preferred embodiment, robotic arm jib 22 is an insulated section made from a rigid dielectric material such as for example fiberglass.

Figures 2, 3:
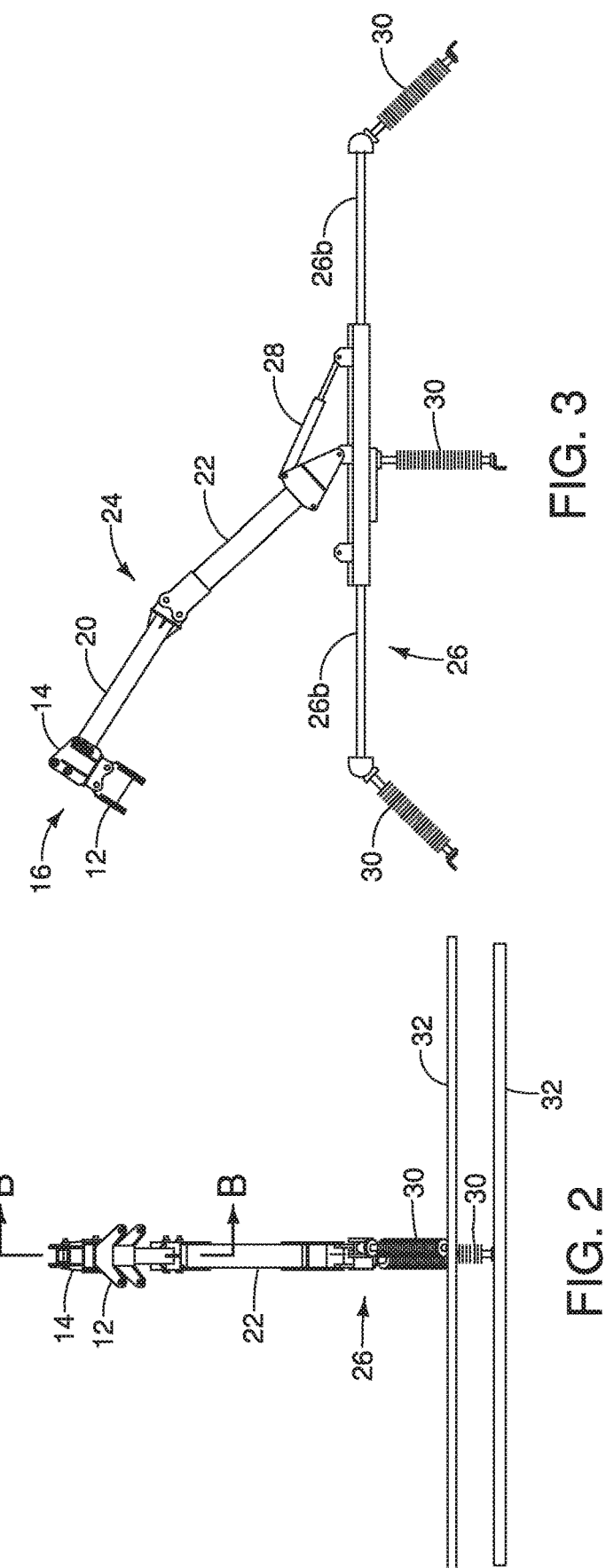
FIG. 2 is, in front elevation view, the inverted robotic arm system of FIG. 1.
FIG. 3 is, in side elevation view, the inverted robotic arm system of FIG. 1.

As better seen in FIG. 3, insulators 30 may be angled outwardly from the ends of extendable telescopic arms 26b if it is desired to increase the spacing between bus bars 32 in order to match the spacing between the electrical apparatus or switches on, in this case, the three conductors 36.

Figure 4:
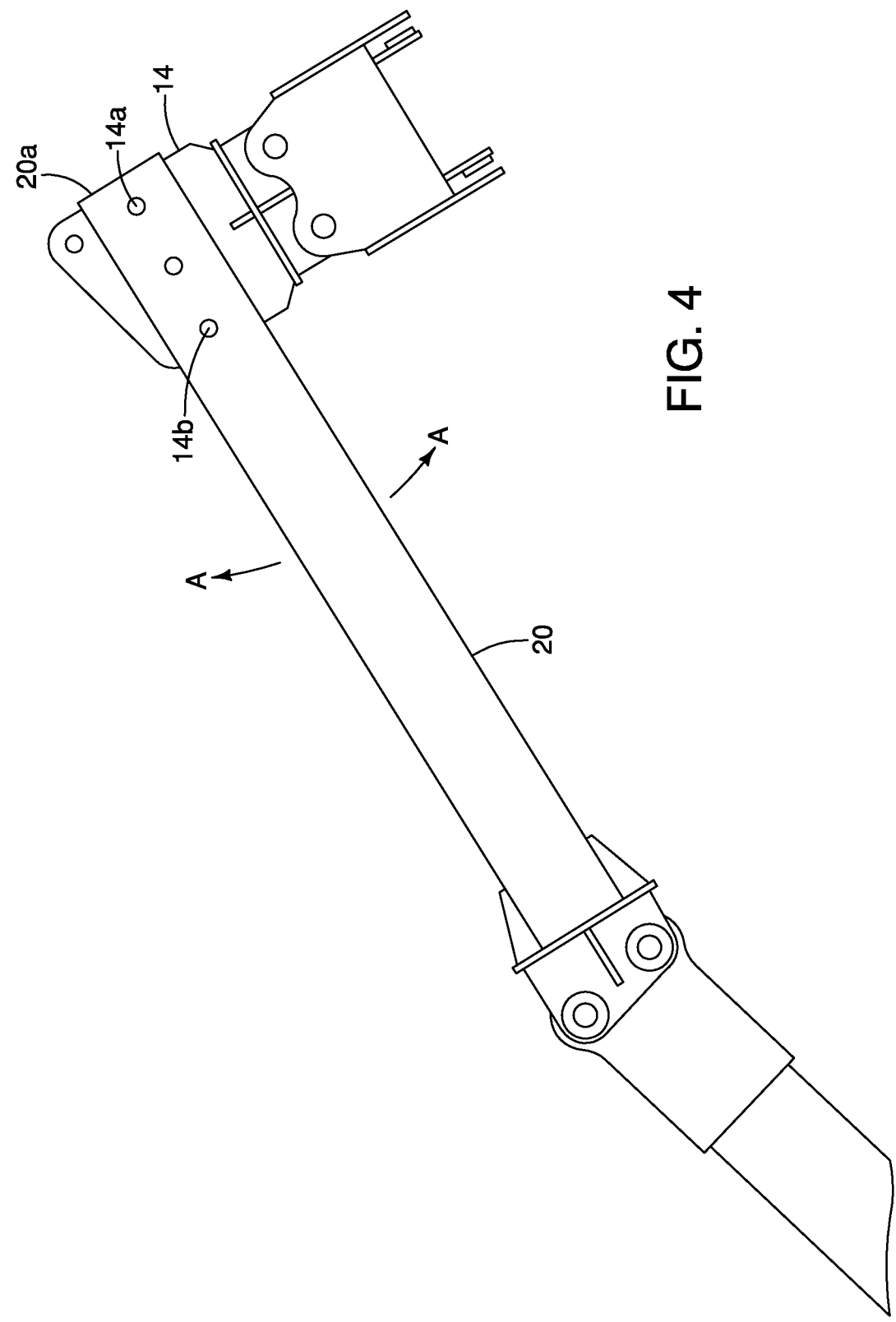
FIG. 4 is a cross-sectional view along line B-B in FIG. 2.
Figure 5:
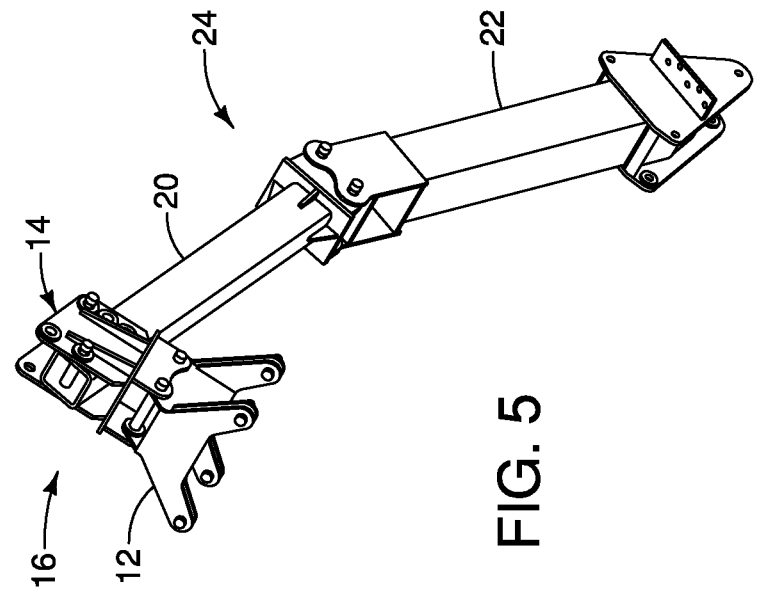
FIG. 5 is, in perspective view, the crane or truck boom head adapter and boom adapter arm of FIG. 1 showing the upper elongate boom adapter arm and lower robotic arm jib assembly forming a swing arm, with the swing arm angled off 90 degrees from the crane or truck boom head adapter so as to be rotated backwardly towards the main boom at 15 degrees.
Figure 19:
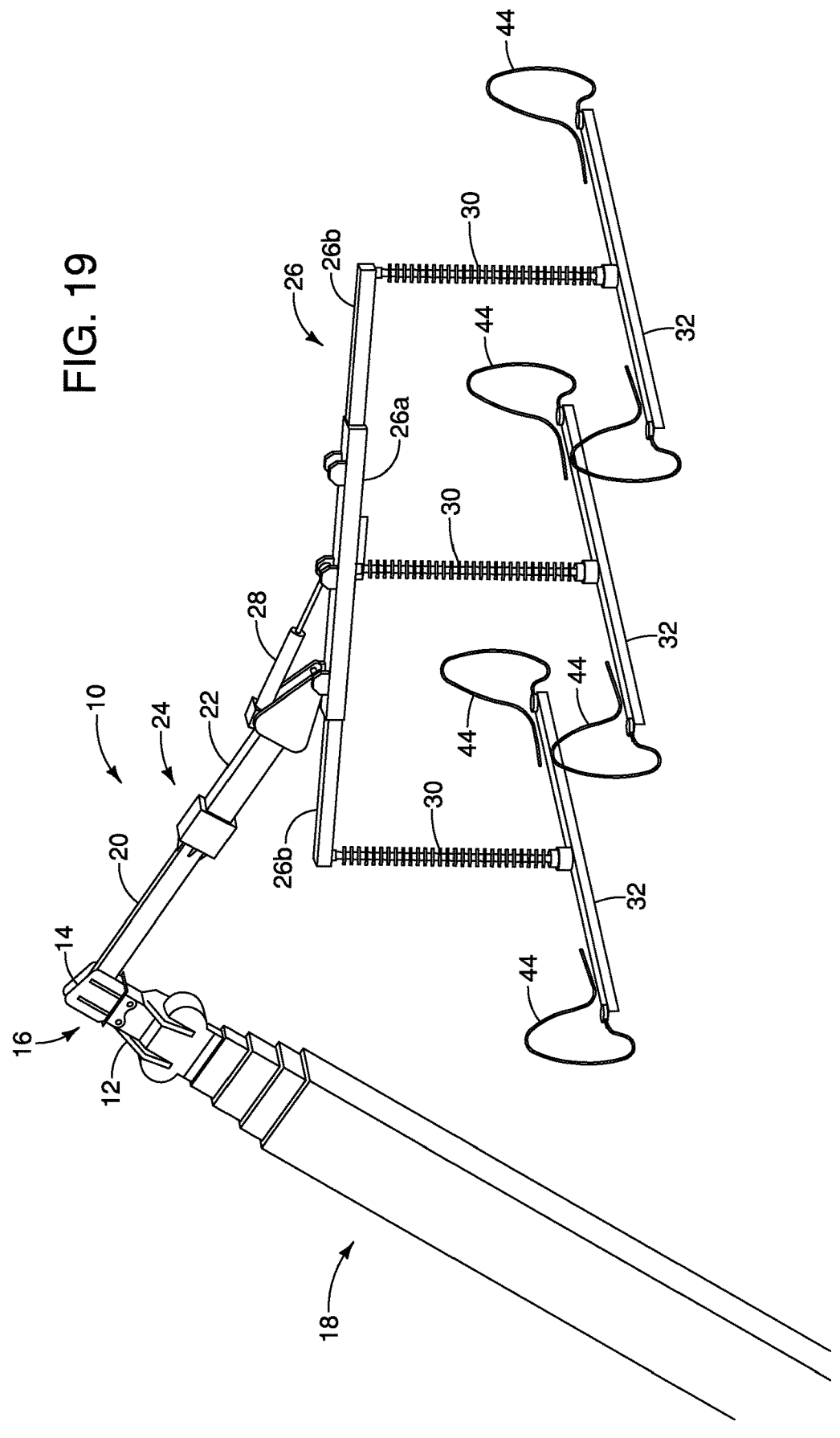
FIG. 19 is, in perspective view, the swing arm and crane or truck boom head adapter system of FIG. 5 mounted on a truck or crane boom and suspending three parallel bus bars attached to corresponding electrical insulators depending from an inverted robotic arm mounted on the lower end of the boom adapter arm.

As seen commencing in FIGS. 19, it may be that insulators 30 depend vertically downwardly from robotic arm 26, again depending on the required spacing between the electrical components being serviced or replaced. As seen commencing in FIG. 4, boom adapter arm 20 is pivotally mounted within hinge coupler 14 by means of a hole and pin arrangement. In particular, and without intending to be limiting, the upper end of boom adapter arm 20, labeled in FIG. 4 for ease of reference as end 20a has a hole through which is journaled a pin 14a, about which boom adapter arm 20 may be pivoted in direction A. Once boom adapter arm 20 is pivoted in direction A to the desired orientation, a second pin 14*b* is inserted into a corresponding hole in boom adapter arm 20, which corresponds to matching holes in the side walls 14*c* of hinge coupler 14 as better seen for example commencing in FIG. 13.

Figures 13, 14:
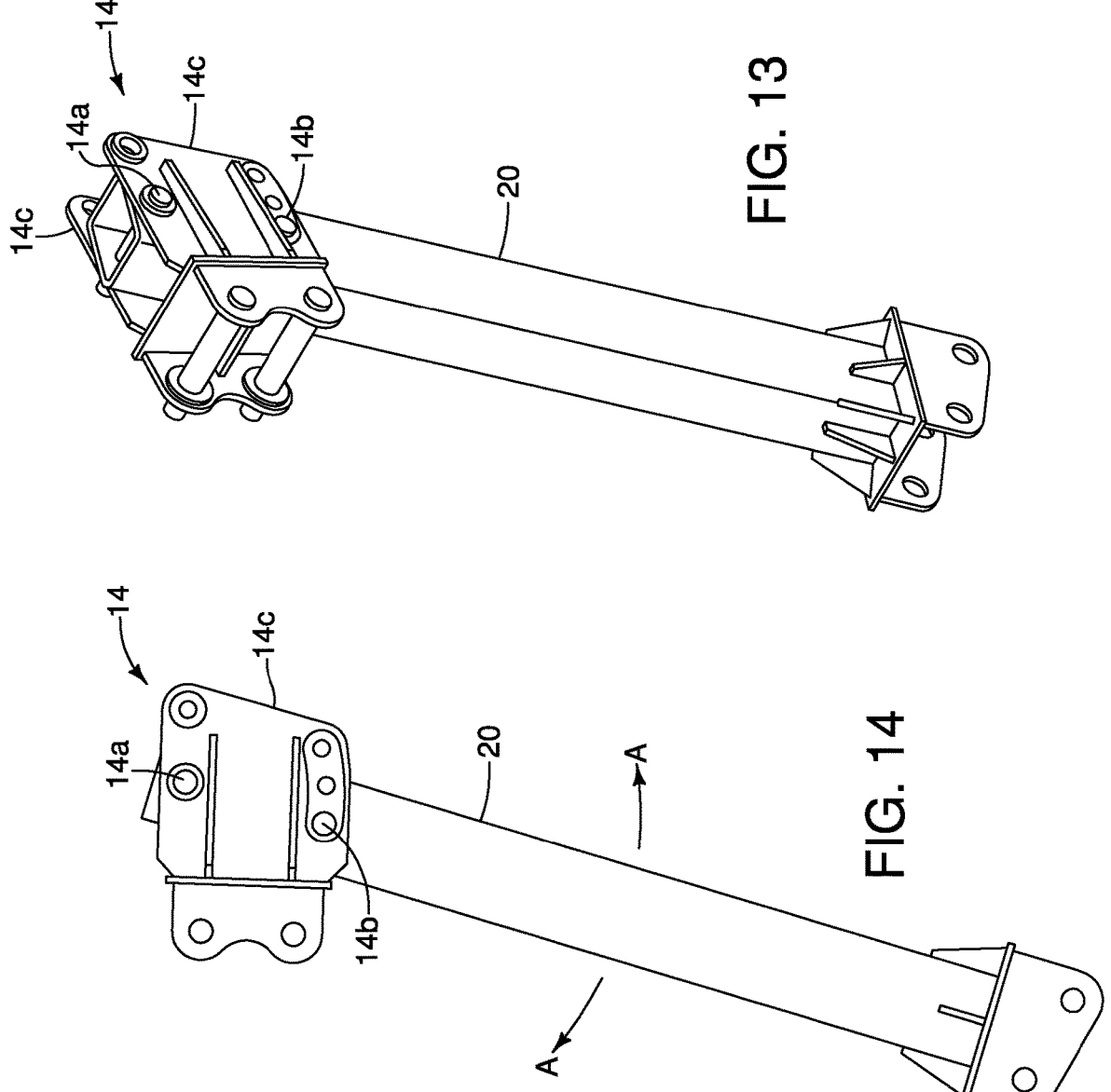
FIG. 13 is, in perspective view, the elongate boom adapter arm and hinge coupler rotated 15 degrees back of FIG. 5.
FIG. 14 is, in side elevation view, the elongate boom adapter arm and hinge coupler of FIG. 13.
Figures 15, 16:
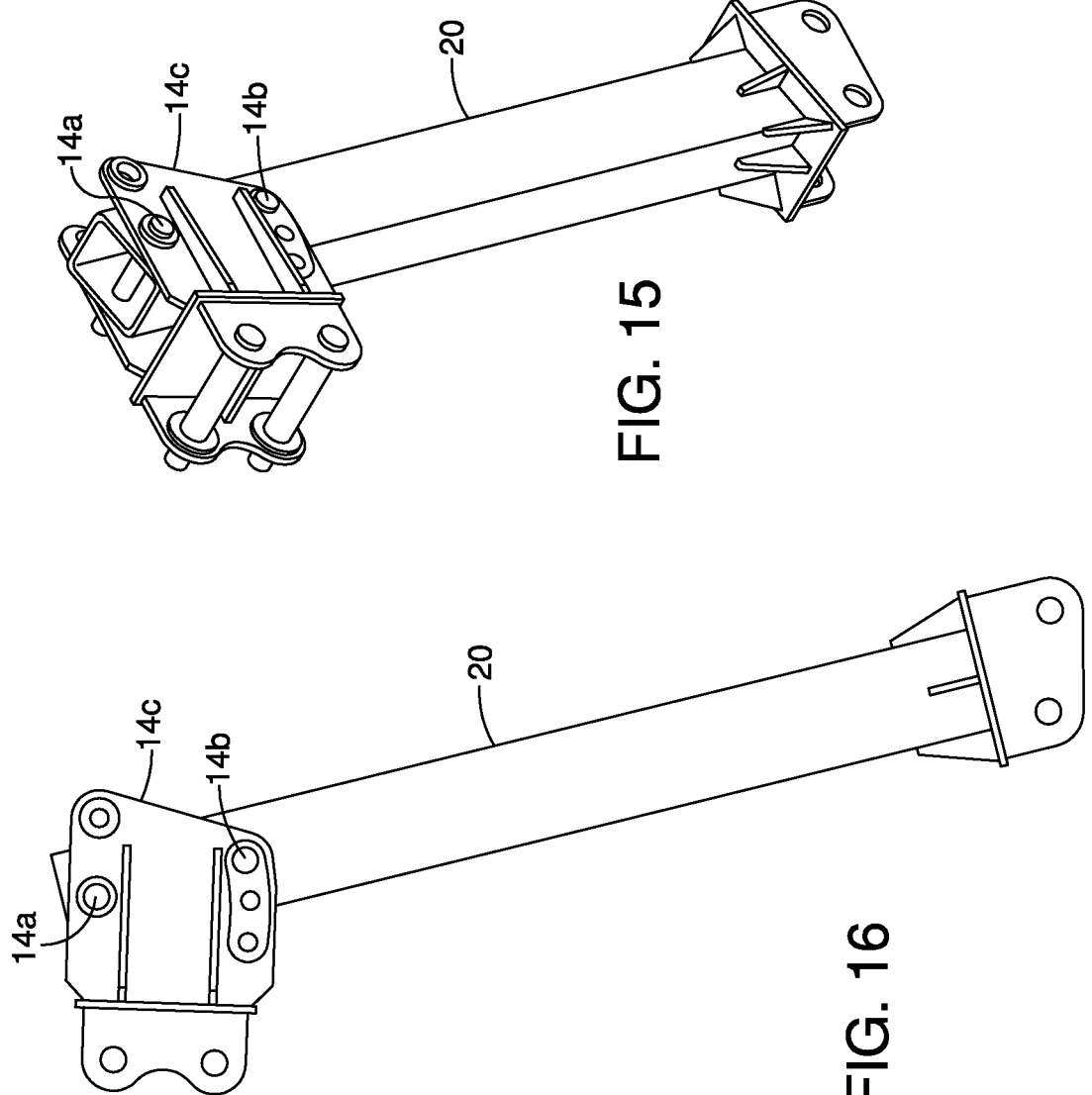
FIG. 15 is, in perspective view, the elongate boom adapter arm and hinge coupler rotated ahead 15 degrees of FIG. 7.
FIG. 16 is, in side elevation view, the elongate boom adapter arm and hinge coupler of FIG. 15.
Figures 17, 18:
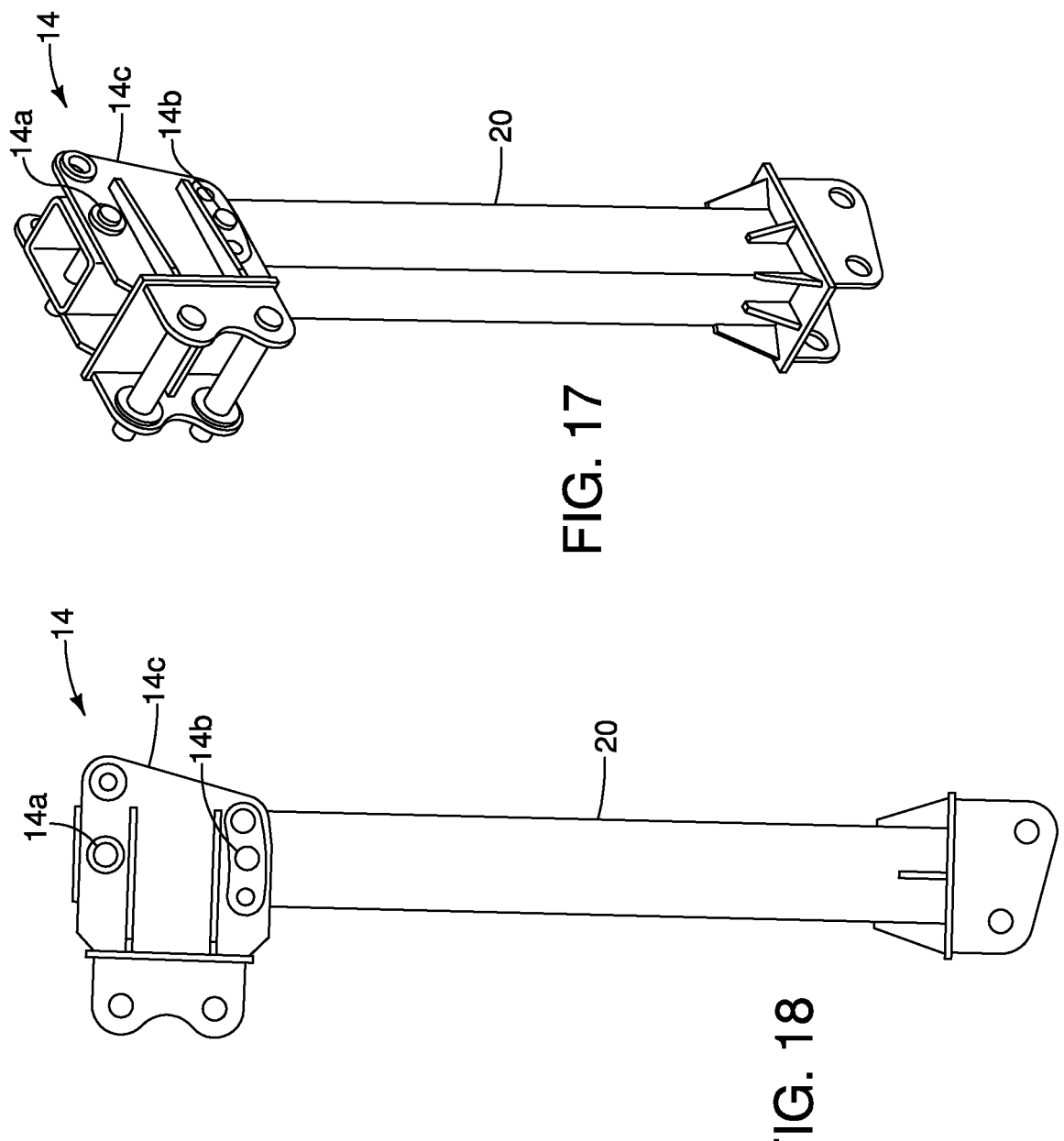
FIG. 17 is, in perspective view, the boom adapter arm mounted at 90 degrees on the hinge coupler so as to be 90 degrees to the main boom.
FIG. 18 is, in side elevation view, the boom adapter arm and hinge coupler of FIG. 17.

Thus as seen in FIGS. 13 and 14, boom adapter arm 20 is free to rotate about pin 14*a* when mounted between side-walls 14*c* of the housing of the hinge coupler 14 so as to angularly position boom adapter arm 20 to a desired angular orientation relative to hinge coupler 14. Once in the desired orientation, pin 14*b* is inserted through correspondingly placed locking pin receiving holes 40 in sidewalls 14*c* and through the corresponding locking-pin aperture or hole 20*c* through boom adapter arm 20 so as to releasably lock boom adapter arm 20 in its desired position. In the orientation of FIGS. 13 and 14, boom adapter arm 20 is fixed in a position rotated 15 degrees back from the 90 degree position seen in FIGS. 17 and 18 so as to be angled 15 degrees closer to crane or truck boom 18. In FIGS. 15 and 16 boom adapter arm 20 is angled oppositely so as to be angled 15 degrees ahead of the 90 degree position seen in FIGS. 17 and 18, thereby angling boom adapter arm 20 15 degrees further away from crane or truck boom 18.

Figure 11:
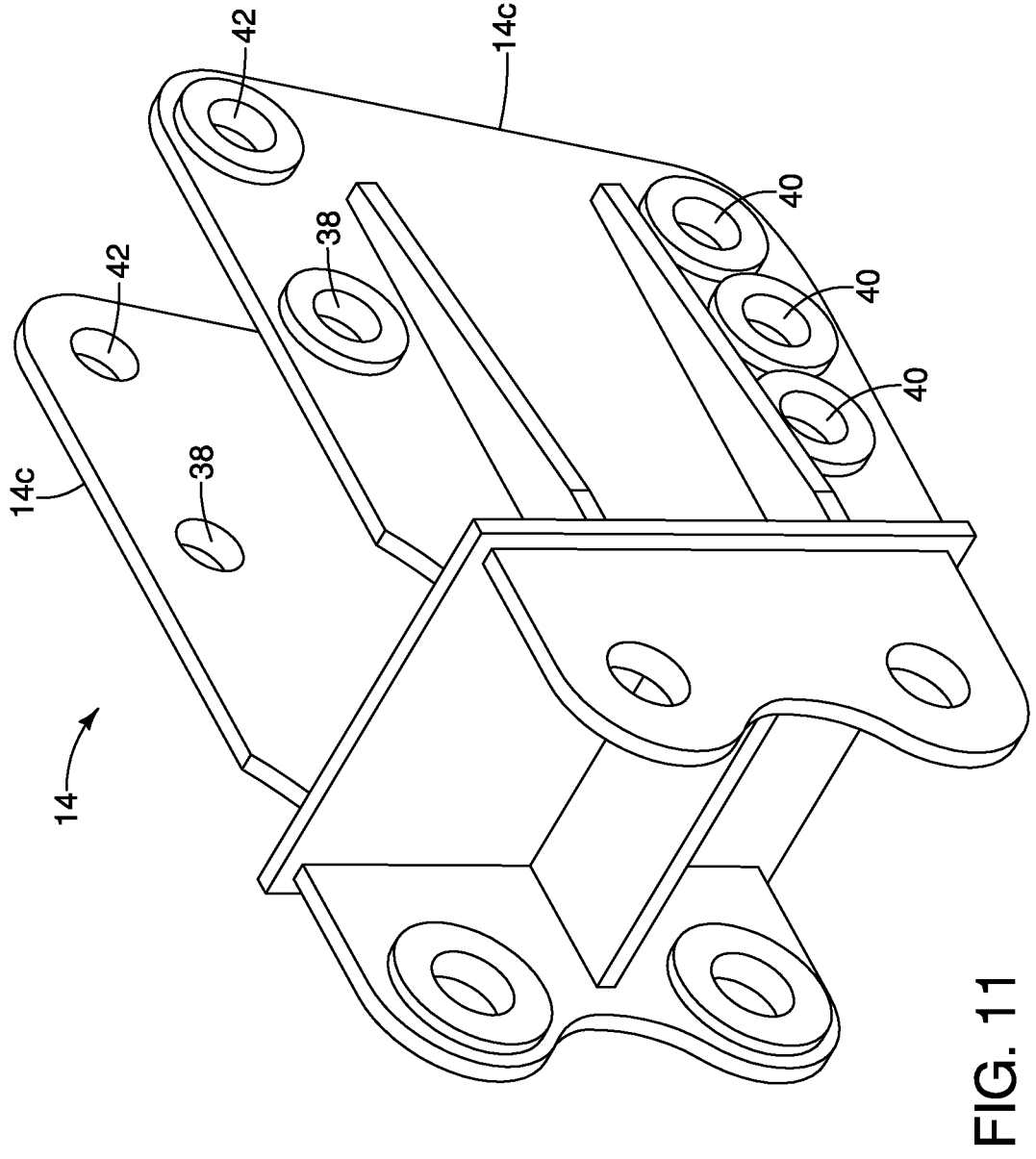
FIG. 11 is, in perspective view, the hinge coupling of the crane or truck boom head adapter of FIG. 5.

One example of a hinge coupler 14 is seen in FIG. 11 where holes 38 are clearly seen through which pin 14*a* is inserted. Holes 40 are also clearly seen through which pin 14*b* is inserted depending on the desired angular position of boom adapter arm 20 when pivoted in direction A about pin 14*a*.

Figures 9, 10:
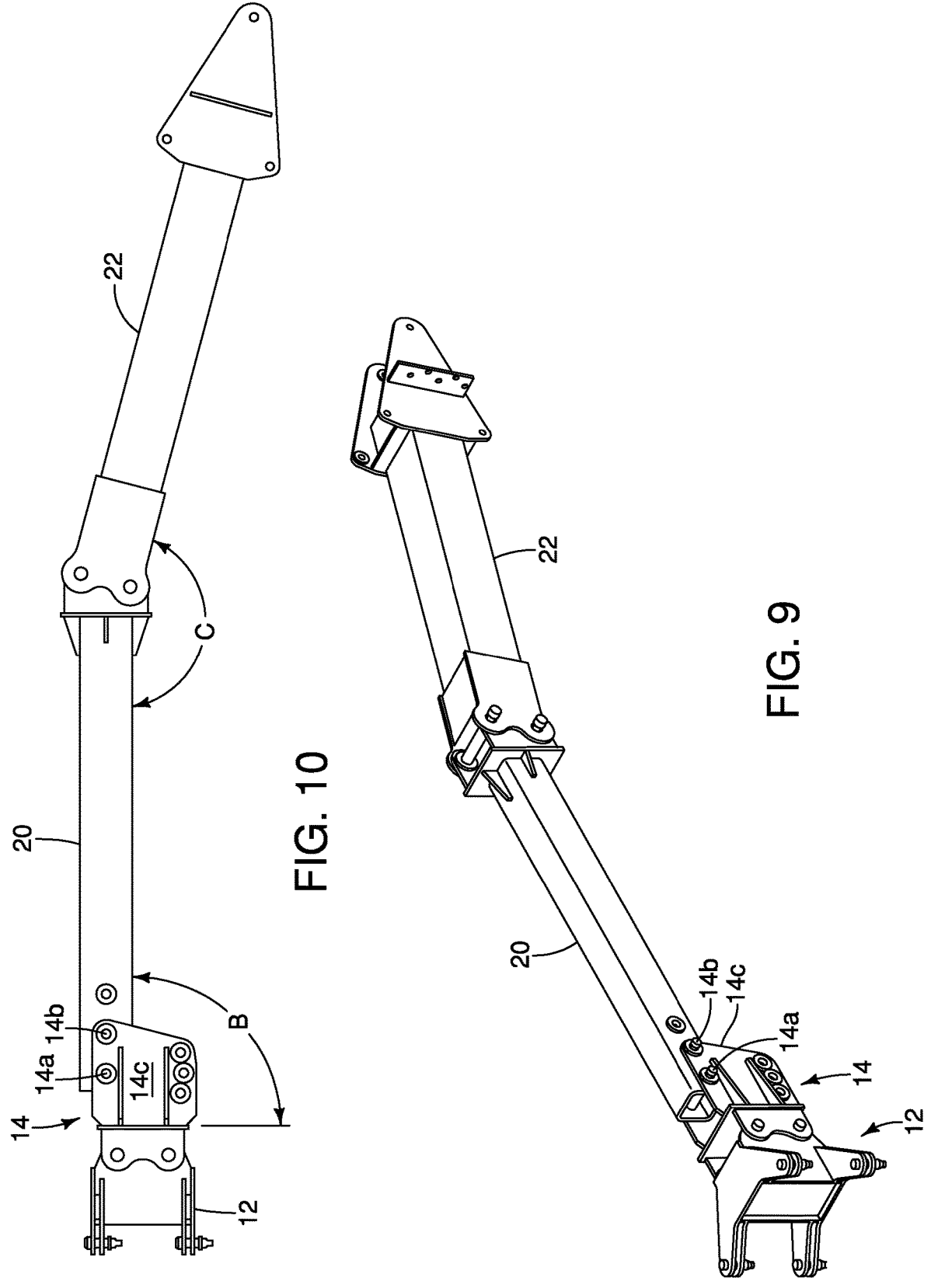
FIG. 9 is the swing arm and crane or truck boom head adapter of FIG. 5 with the elongate boom adapter pivoted relative to the boom head adapter so as to be in line with the main boom.
FIG. 10 is, in side elevation view, the swing arm and boom head adapter of FIG. 9.
Figure 12:
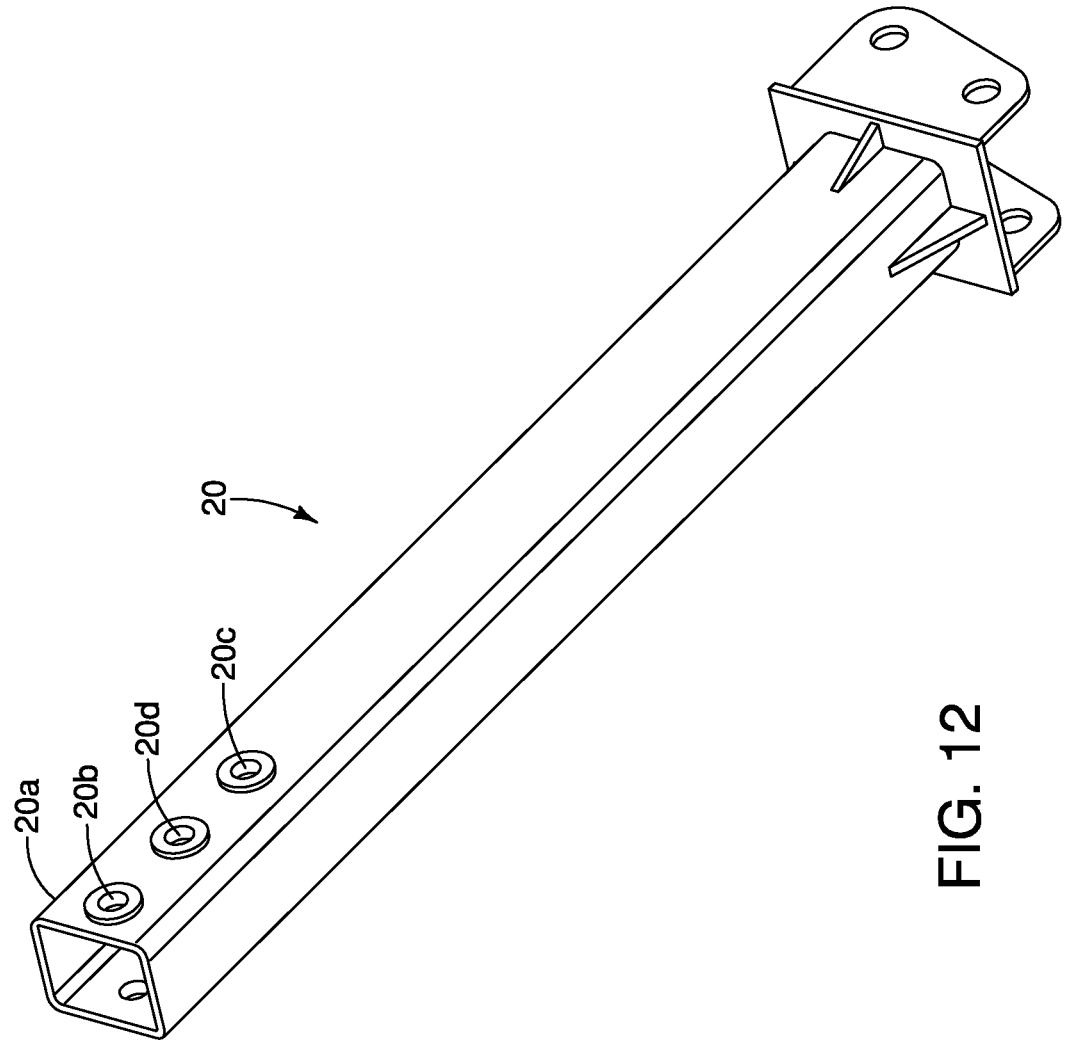
FIG. 12 is, in perspective view, the elongate boom adapter arm of FIG. 5.

One example of boom adapter arm 20 is shown illustrated in FIG. 12. The uppermost hole 20*b* in end 20*a* of boom adapter arm 20 is the hole through which pin 14*a* is inserted to allow the pivoting of boom adapter arm 20 in direction A. Hole 20*c* is provided for the insertion of pin 14*b* so as to lock the angular orientation of boom adapter arm 20 about pin 14*a*. Hole 20*d* is provided when it is desired to rotate boom adapter arm 20 so as to be in line with crane or truck boom 18. As seen in FIG. 9, pin 14*b* is inserted through holes 42 in hinge coupler 14 and through hole 20*d* in boom adapter arm 20.

Moving now to the system implementation in the two examples illustrated in FIGS. 19 through 28, an inverted robotic arm system 10 is shown in FIG. 19 mounted onto the upper end of a retracted crane or truck boom 18. Boom 18 is angled upwardly at 45 degrees. As may be seen in FIG. 19, in addition to the inverted robotic arm system 10 of FIG. 1, flexible electrically conductive jumper cables 44 are mounted to the opposite ends of bus bars 32 so as to be electrically connected thereto. In FIG. 19 jumper cables 44 are folded up on top of bus bars 32 so as to conveniently store them during the positioning of system 10 over the electrical components, such as switches 34, to be maintained or replaced.

Figure 20:
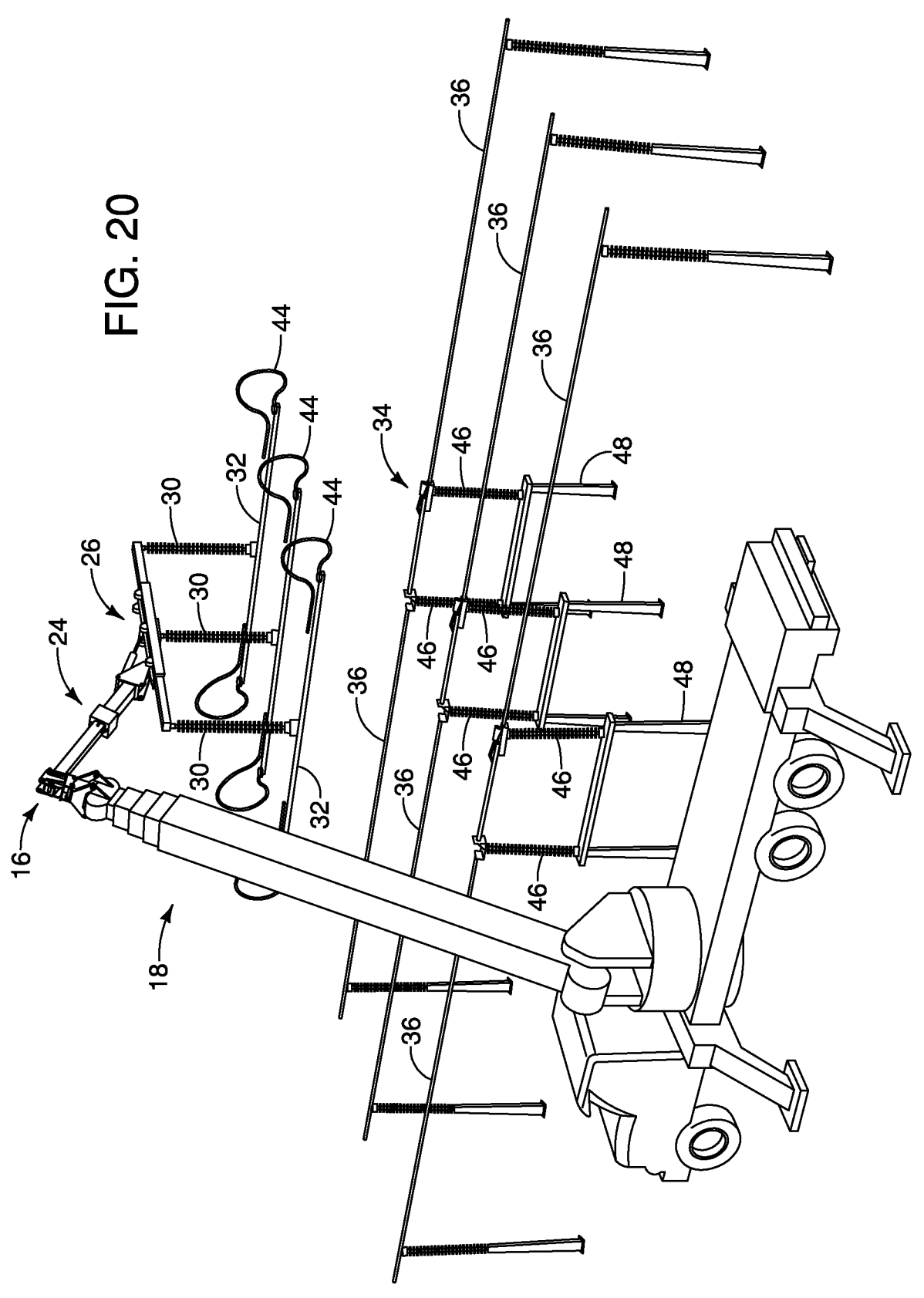
FIG. 20 is the system of FIG. 19 shown mounted on a crane or truck boom and positioned so that the bus bars are above and parallel with three corresponding switches needing replacement or maintenance.

As seen in FIG. 20, switches 34 are mounted on insulators 46. Insulators 46 are themselves mounted on switch bases 48. Live conductors 36 are mounted on opposite ends of each of the three switches 34 corresponding to three phase conductors. Conductors 36 and switches 34 are parallel and equally spaced apart relative to one another. As seen in FIG. 20, system 10 is positioned so that bus bars 32 are directly above and parallel with switches 34 and the corresponding adjacent ends of conductors 36.

Figure 21:
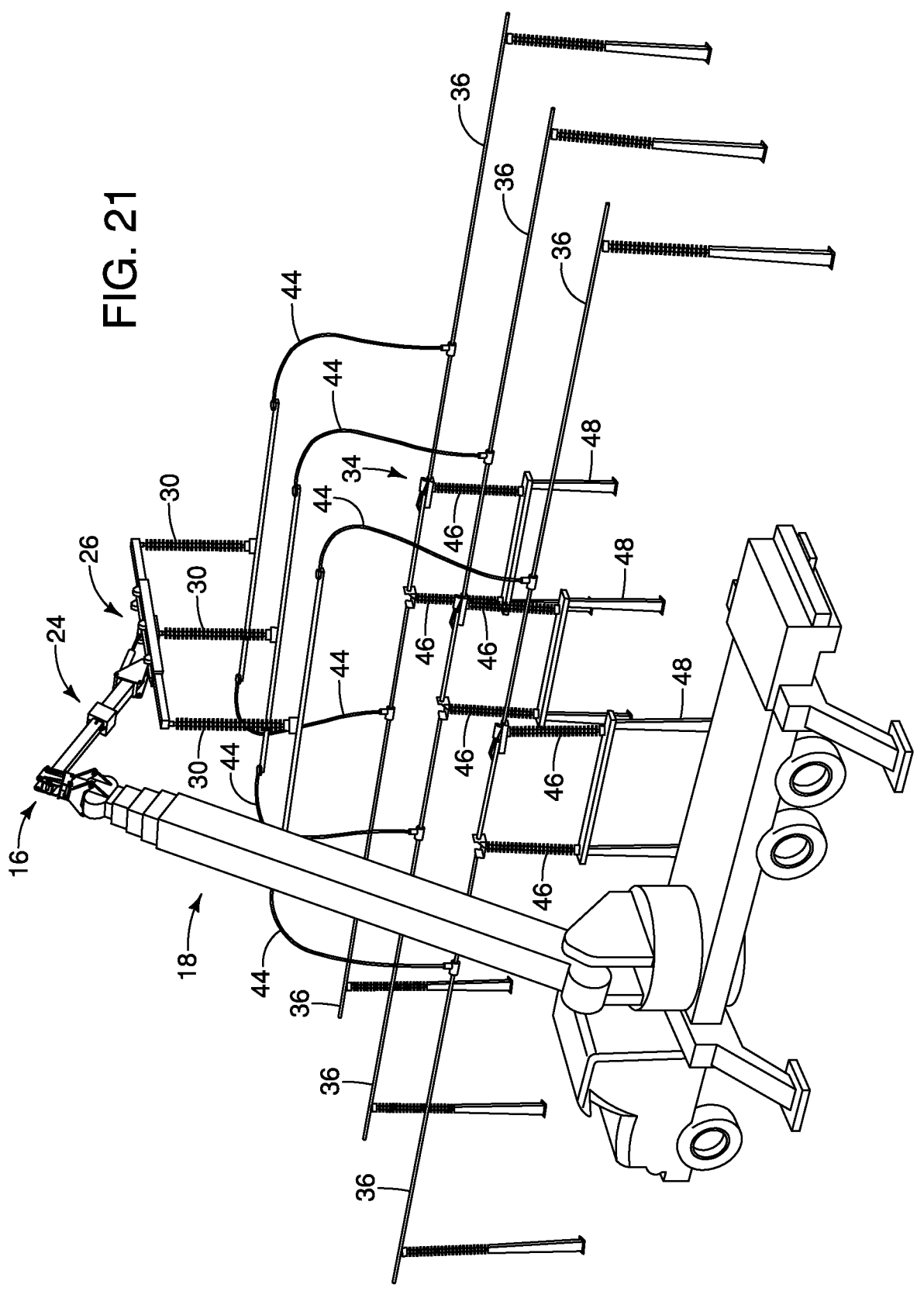
FIG. 21 is the system of FIG. 20 showing the deployment of jumper cables mounted off the end of each bus bar and electrically connected to corresponding conductors on each side of each switch thereby paralleling the electrical load around each switch.

As seen in FIG. 21, with the bus bars 32 positioned above switches 34, jumper cables 44 are deployed from their storage position on bus bars 32 and electrically connected down onto their corresponding live conductors 36. The line load in conductors 36 is thus paralleled around each of the switches 34 along the corresponding electrical paths through jumper cables 44 and bus bars 32.

Figure 22:
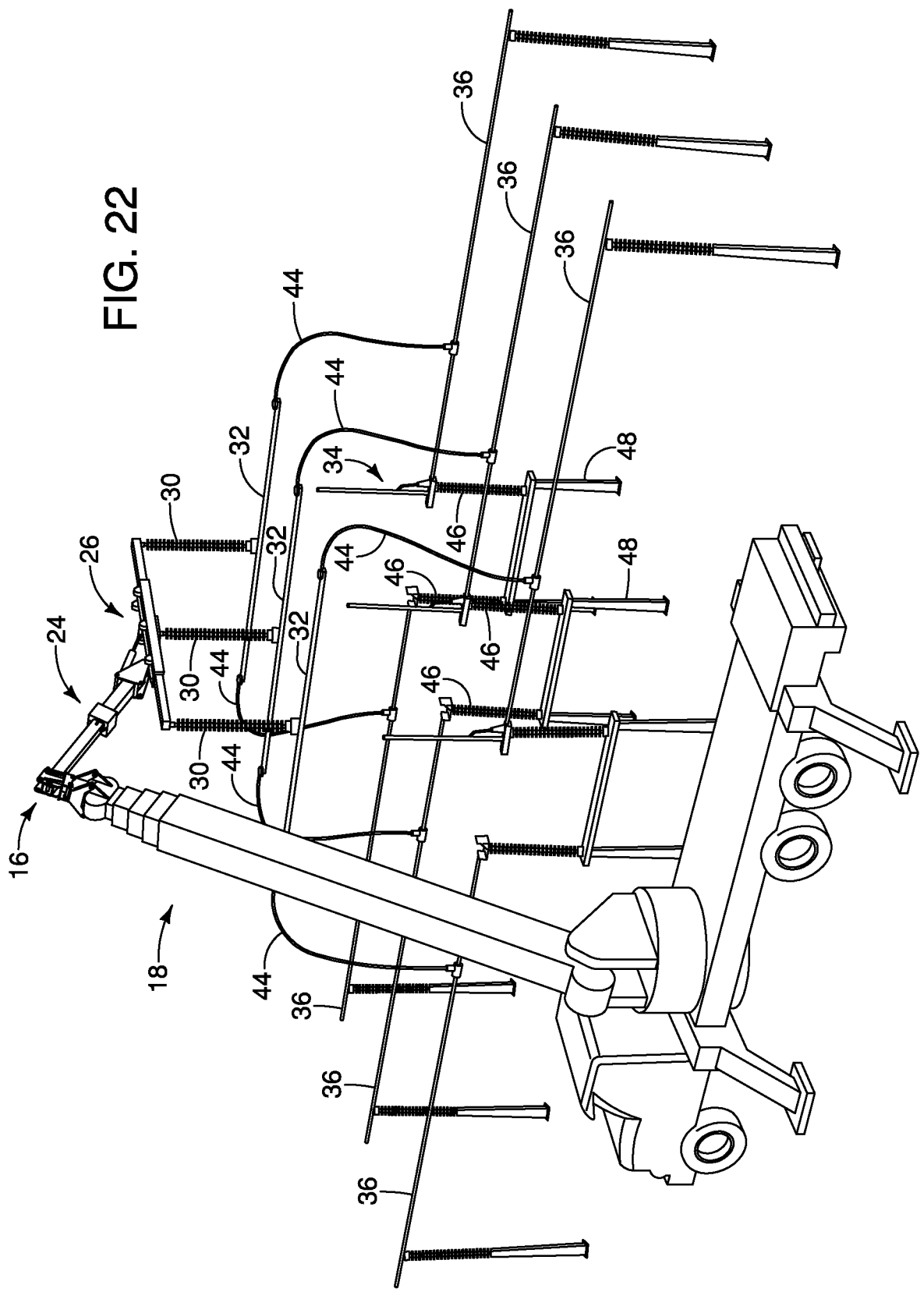
FIG. 22 is the system deployment view of FIG. 21 showing the switches now in their open position to thereby transferring the electrical load through the jumpers and bus bars thereby allowing for maintenance or replacement of the switches.
Figure 23:
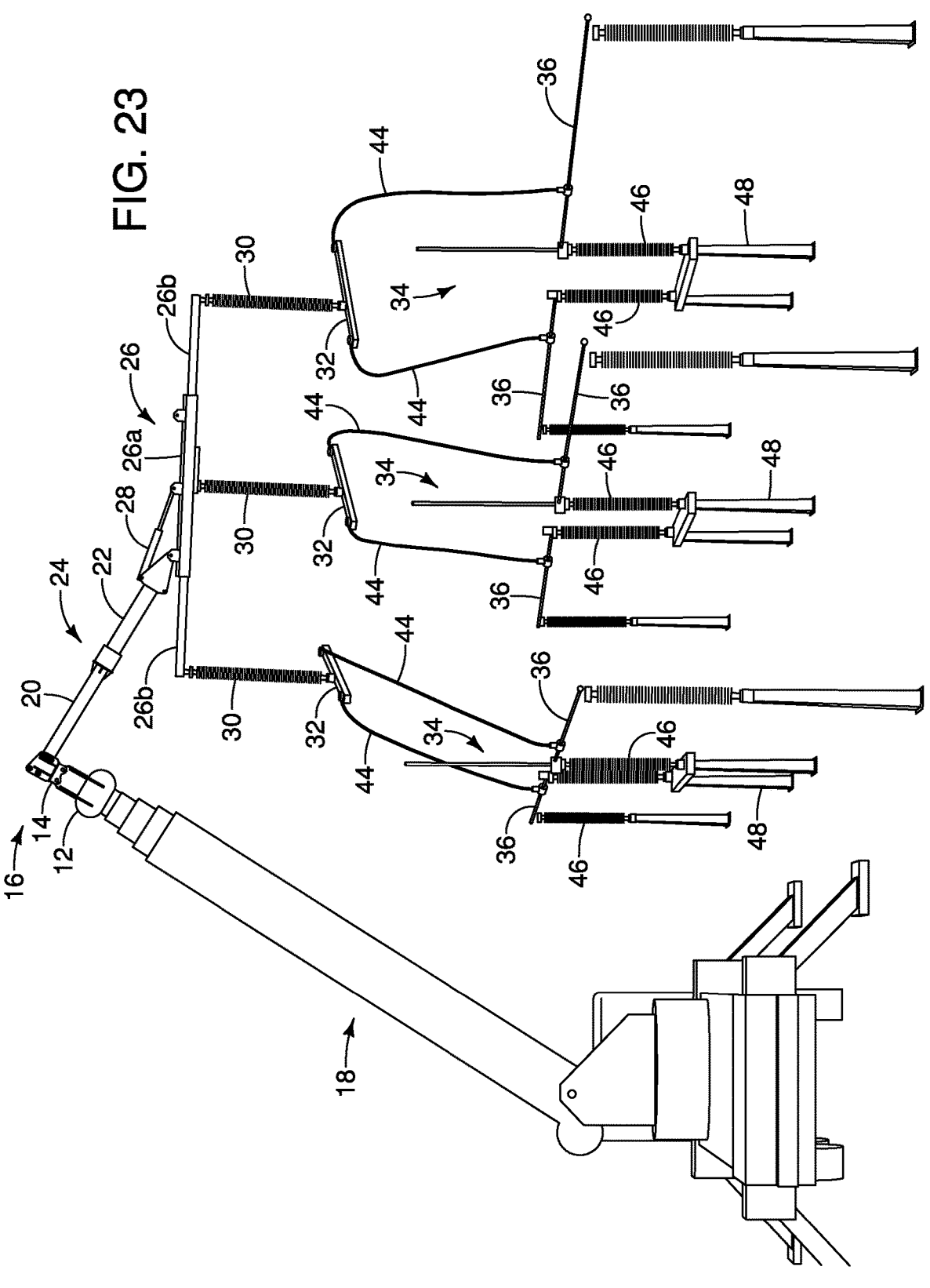
FIG. 23 is the system deployment view of FIG. 22 from a perspective showing an in-line view of the electrical bypass around each switch.
Figure 24:
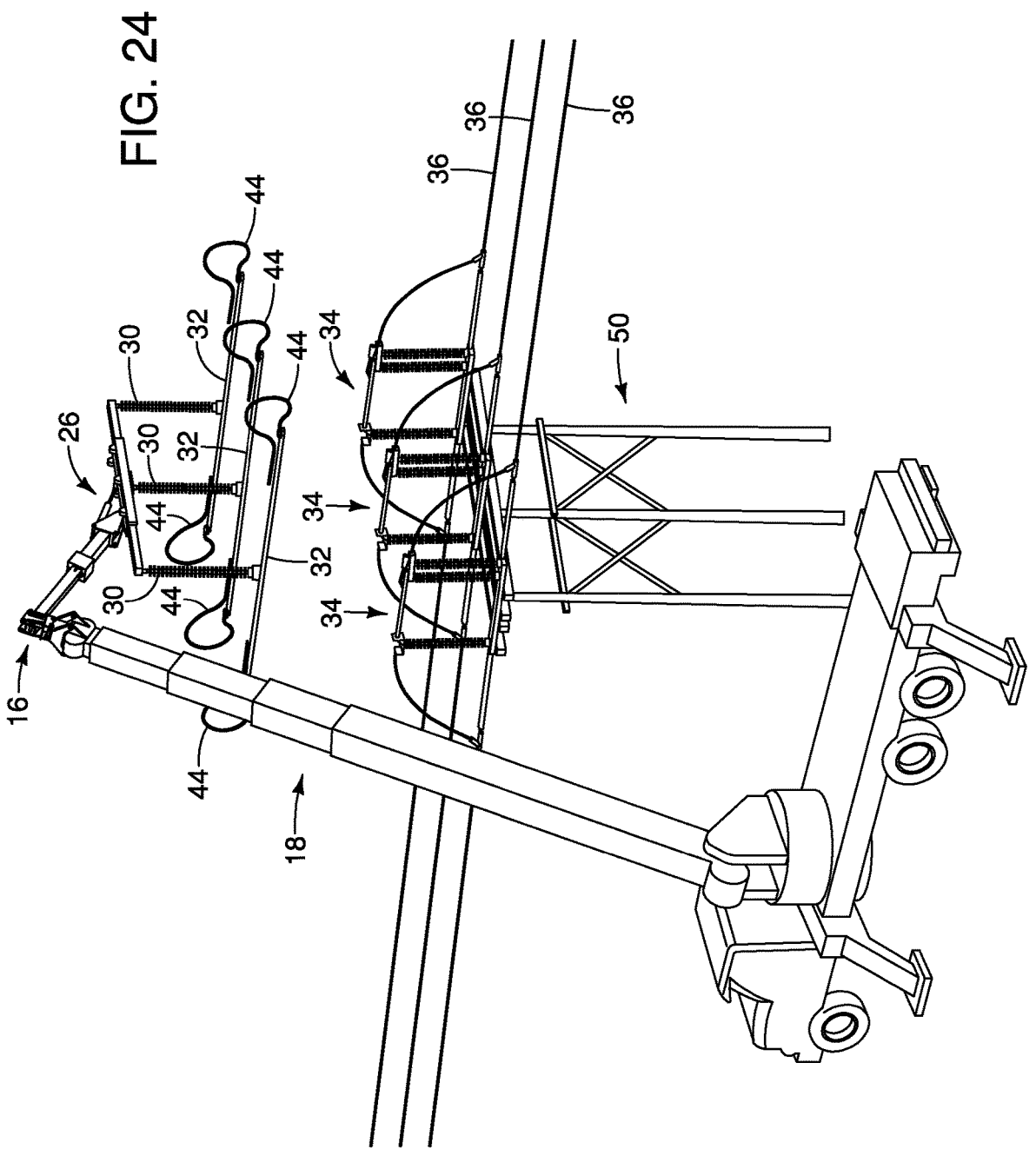
FIG. 24 is the system deployment view of FIG. 20 showing the bus bars positioned above and aligned with elevated pole-mounted switches and with the inverted robotic arm correspondingly elevated by extension of the crane or truck boom.
Figure 25:
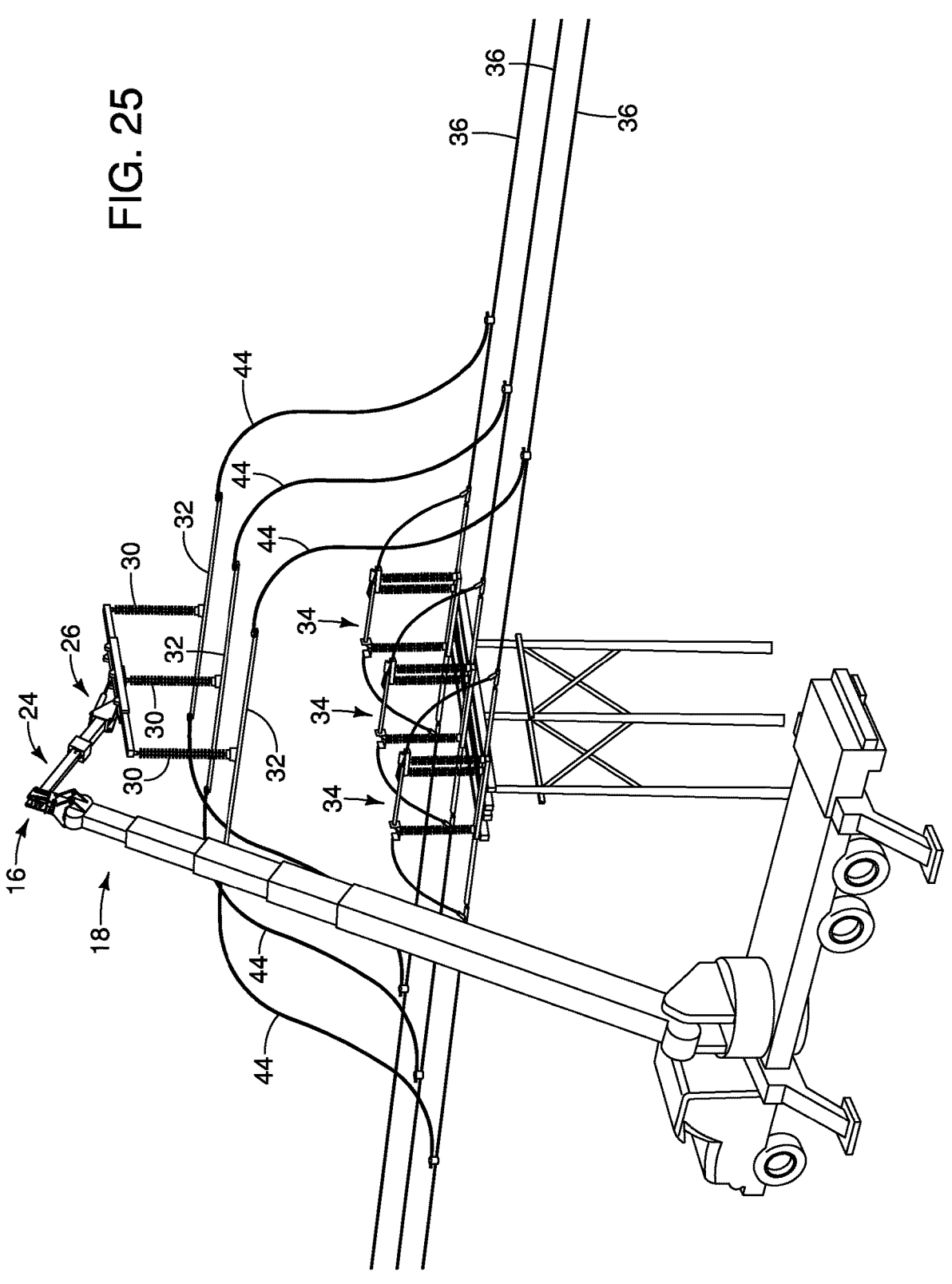
FIG. 25 is the system deployment view of FIG. 24 showing the jumper cables deployed and connected down onto each conductor on each side of the pole—mounted switches so as to parallel the electrical load around each switch.
Figure 26:
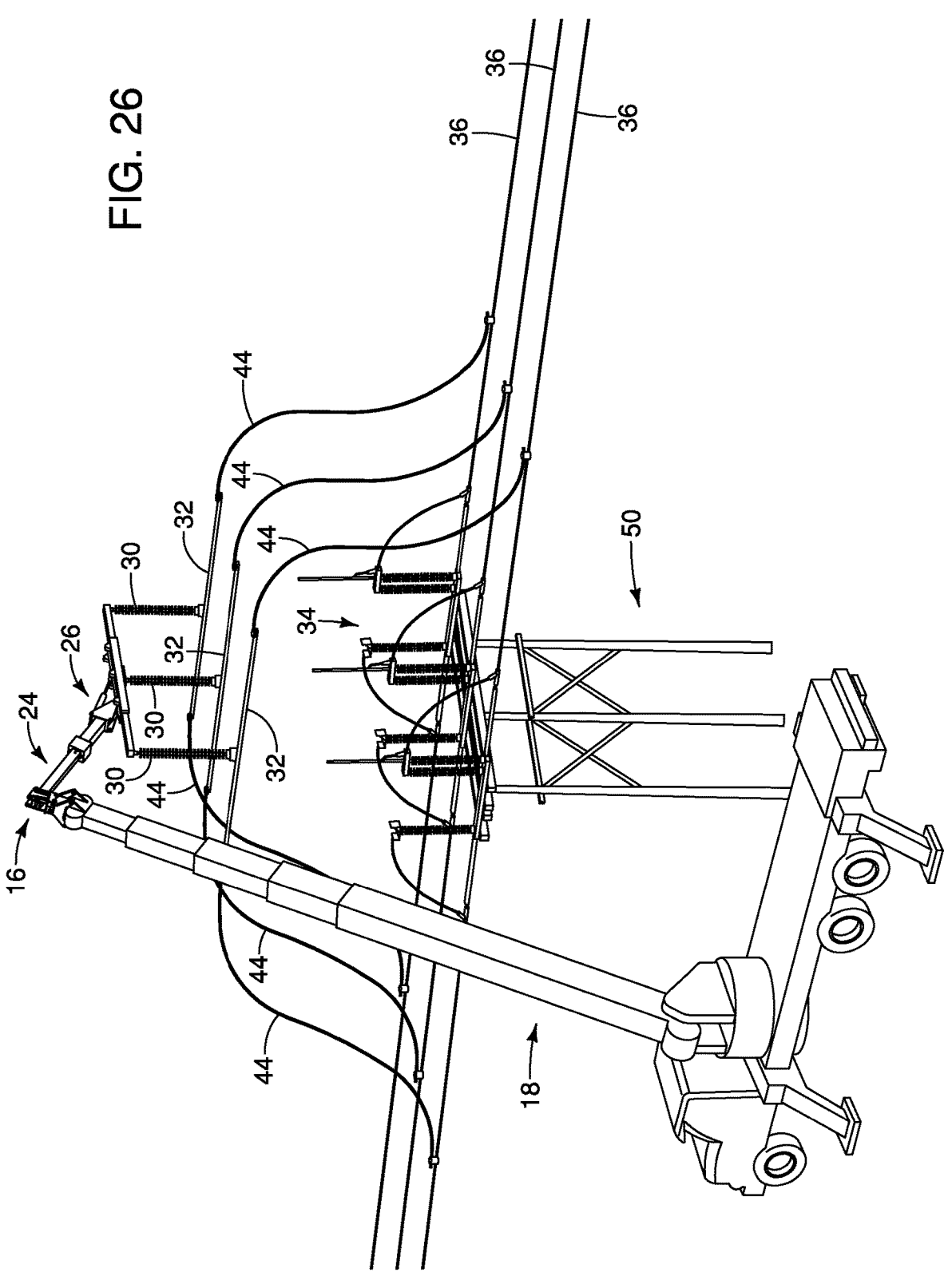
FIG. 26 is the system deployment view of FIG. 25 showing the switches now in their open position so as to transfer the electrical load through the jumper cables and bus bars allowing for maintenance or replacement of the switches.
Figure 27:
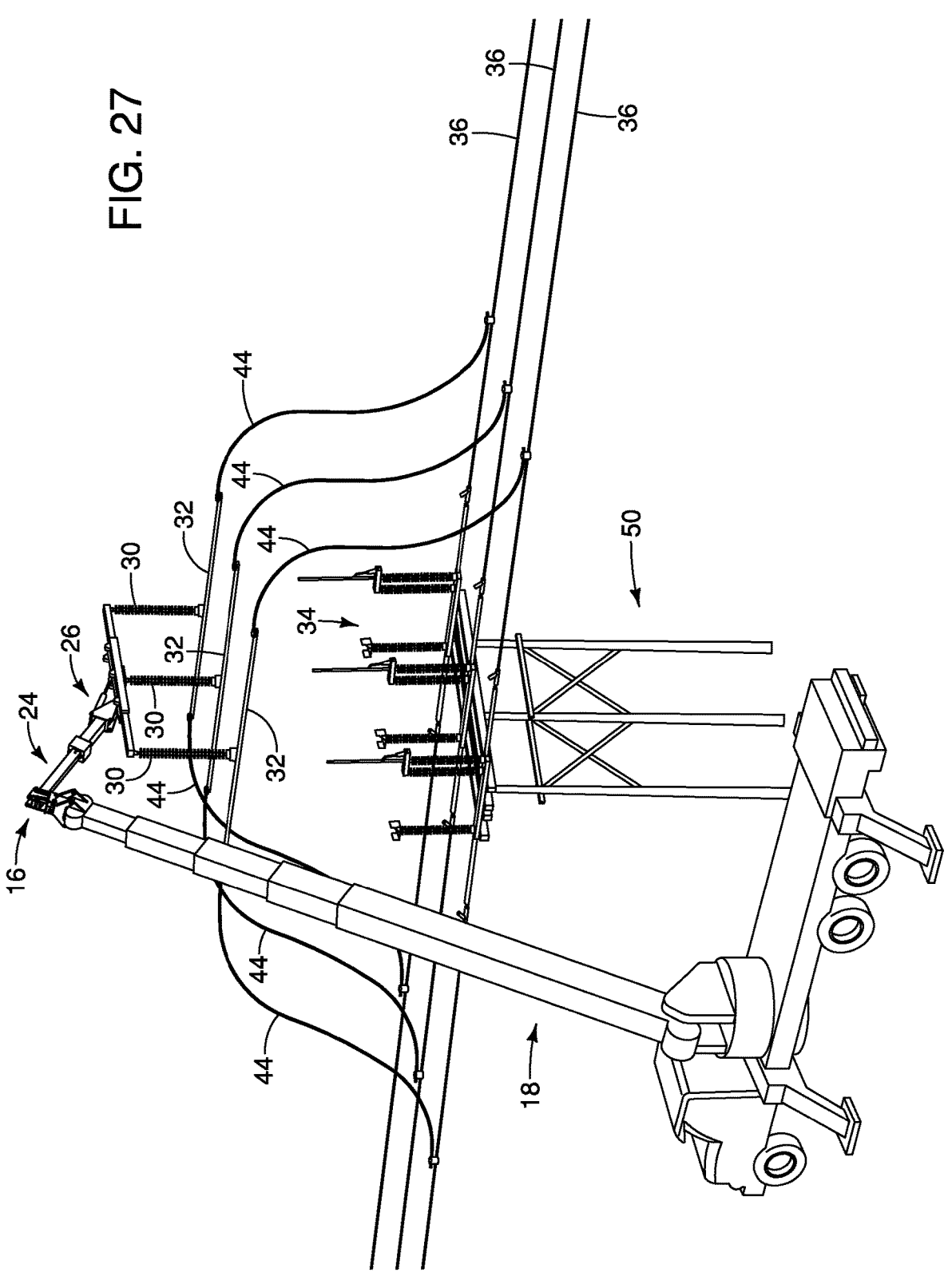
FIG. 27 is the system deployment view of FIG. 26 showing the switch jumper cables removed from between the switches and their corresponding conductors thereby isolating and de-energizing each pole-mounted switch allowing for maintenance or replacement of the switches.
Figure 28:
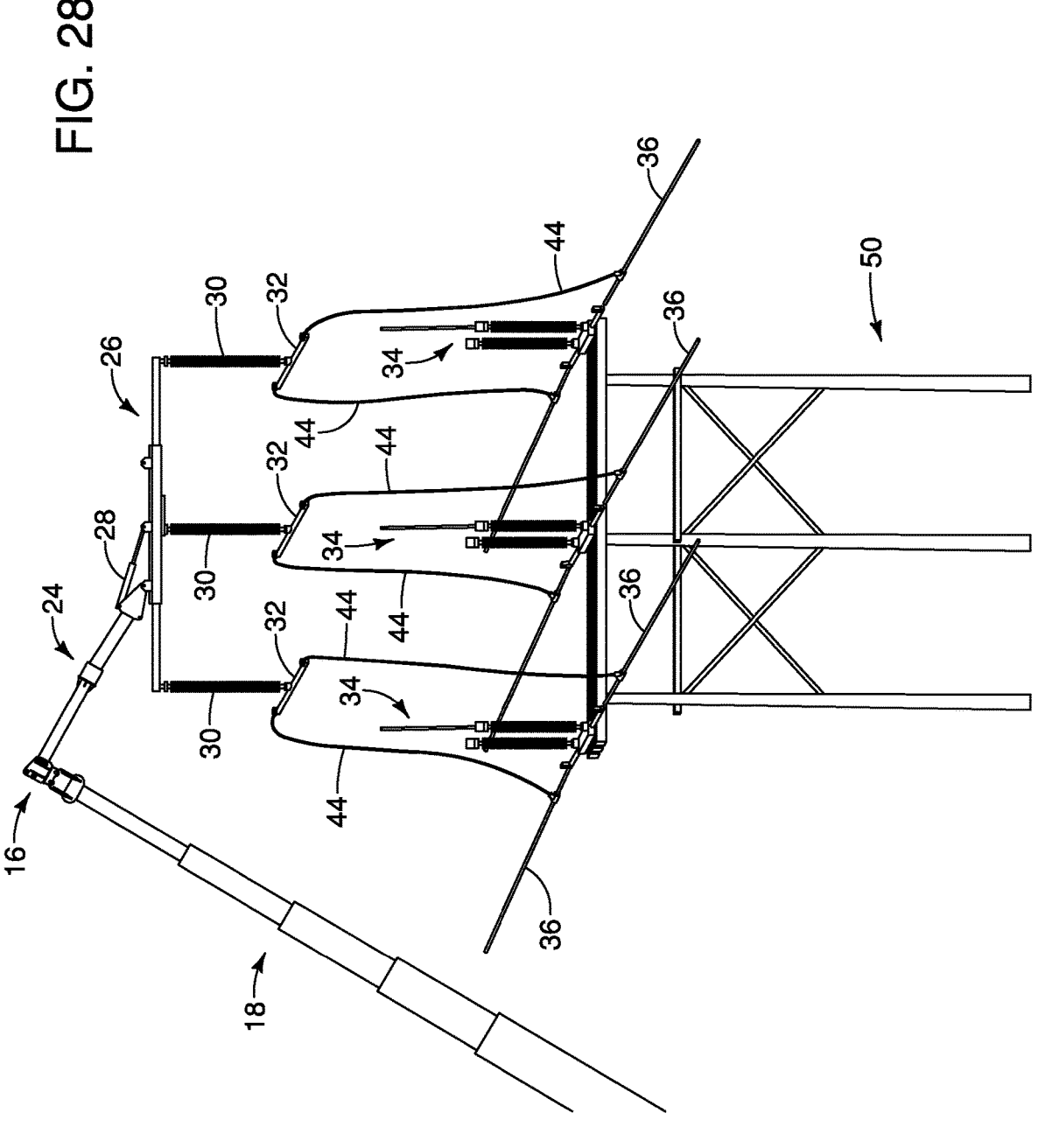
FIG. 28 is a further perspective view of the system deployment view of FIG. 27 showing an in line view of the bypassed pole-mounted switches.

FIG. 22 illustrates where switches 34 have been opened so as to break the electrical connection thereby transferring the entire electrical load from conductors 36 around the bypass formed by jumper cables 44 and their corresponding bus bars 32. Switches 34 may now be repaired or replaced as required.

In FIGS. 24-28 the same bypass procedure as illustrated in FIGS. 20-23 is set out again, the only difference being that switches 34 are mounted on high-rise supports such as the illustrated pole structures 50. As may be seen, in order to properly orient and position system 10 over switches 34, crane or truck boom 18 is extended from its retracted position of FIG. 19.

Figure 29:
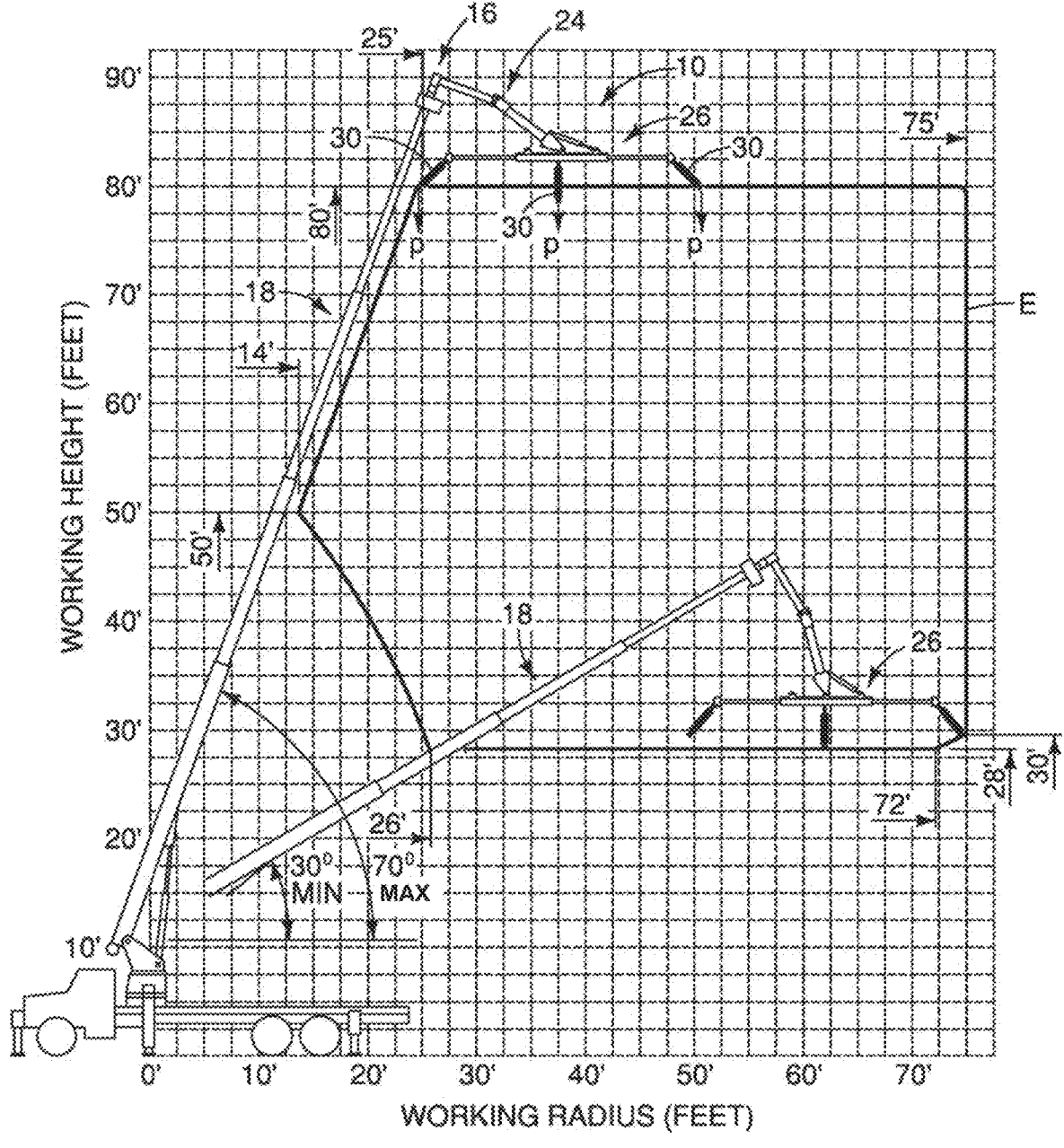
FIG. 29 is an example of a load chart showing allowable working heights and working radiuses for a crane or truck boom supporting an inverted robotic arm system and electrical bypass.

As seen in the load chart of FIG. 29, when system 10 is mounted as described above onto crane or truck boom 18 so as to support bus bars 32 and jumper cables 44 for electrical bypass of electrical components as also described above by way of example, the range of motion of the crane or truck boom is constrained so as to not exceed the safe work load of the inverted robotic arm and capacity of the crane or truck boom. In the illustrated example of FIG. 29, an inverted LineMaster™ model 9201 robotic arm is supported from the upper end of the crane or truck boom on an Altec model AC-38-127S-EJ crane. 45 inch station class insulators (Se-diver™ with heavy duty adaptor kits) mounted on the robotic arm provide a per phase loading allowance in direction P of approximately 300 lbs. vertical. An operating envelope E, plotted as the limits of working height versus working radius of the boom relative to the crane or truck, is outlined by way of example in FIG. 29, outside of which bus bars 32 are not permitted so as to not exceed the safe work load of the inverted robotic arm and capacity of the crane or truck boom.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A robotic arm system including a robotic arm and an apparatus for mounting the robotic arm in an inverted position from a free end of a crane or truck boom to suspend a free end of an at least one elongate electrical insulator on the robotic arm above and over an energized electrical component, the system comprising:
   a) a releasably lockable hinge coupler having a pivot linkage, wherein the hinge coupler is adapted for mounting to the free end of the boom;
   b) an elongate boom adapter arm having opposite first and second ends, wherein the boom adapter arm is pivotally mounted, at the first end thereof, on the pivot linkage for releasably lockable pivoting of the boom adapter arm about the pivot linkage relative to the hinge coupler so as to be selectively oriented downwardly relative to a long axis of the boom;

c) an elongate robotic arm jib having opposite first and second ends wherein the first end of the robotic arm jib is mounted to the second end of the boom adapter arm so as to extend from the boom adapter arm;

d) a robotic arm pivotally mounted to the second end of the robotic arm jib so as to be selectively rotatable to a horizontal orientation;

e) an actuator cooperating between the second end of the robotic arm jib and the robotic arm, to selectively rotate the robotic arm relative to the robotic arm jib;

wherein, in operation, when the boom adapter arm and the robotic arm jib are mounted so as to extend downwardly from the pivot linkage, and so as to be spaced away by an included angle from the free end of the boom whereby the robotic arm is also spaced away from the boom to provide working clearance and minimum approach distance between the boom and the robotic arm when the robotic arm is in proximity to the energized electrical component, the at least one electrical insulator on the robotic arm is oriented vertically downwardly from the robotic arm to position the free end of the at least one electrical insulator above and over the electrical component.

2. The system of claim 1 further comprising a crane or truck boom adapter mountable between the free end of the boom and the hinge coupler, and wherein the hinge coupler includes a housing supporting the pivot linkage, and wherein the housing is mountable to the boom adapter.

3. The system of claim 2, wherein the pivot linkage includes a pin mounted through the housing, and wherein the first end of the boom adapter arm pivots about the pin to extend the boom adapter arm downwardly from the housing in its operational position.

4. The system of claim 2, wherein the housing has side walls having locking pin receiving holes therein arrayed in an arc about the pivot linkage, and the boom adapter arm has a locking pin aperture to receive a locking pin therein, and wherein the boom adapter arm is pivotable about the pivot linkage so as to align a selected locking pin receiving hole in the housing with the locking pin aperture for receiving the locking pin through the selected locking pin receiving hole and the locking pin aperture to thereby lock the boom adapter arm relative to the hinge coupler at a selected orientation.

5. The system of claim 1, wherein the included angle between the boom and the boom adapter arm is in the range of 60-120 degrees.

6. The system of claim 5, wherein the range is 75-105 degrees.

7. The system of claim 6, wherein the included angle is substantially 90 degrees.

8. The system of claim 1, further comprising an electrical bypass mounted on the free end of the at least one electrical insulator, and wherein the electrical bypass includes a bus bar coupled to the free end of the at least one electrical insulator.

9. The system of claim 8, wherein the electrical bypass further comprises electrical cables electrically connected to opposite ends of the bus bar, and wherein the bus bar and cables are electrically connectable around the electrical component so as to electrically bypass the electrical component.

10. The system of claim 9, wherein the electrical component is a switch.

11. The system of claim 1, wherein the at least one electrical insulator is a plurality of electrical insulators.

12. The system of claim 11, wherein the electrical component includes three switches on each of three corresponding phase conductors, and the plurality of electrical insulators includes three electrical insulators, one for each phase of the three corresponding phase conductors, and wherein the free ends of the three electrical insulators are each adapted to releasably hold a corresponding electrical bypass.

13. The system of claim 12, wherein each electrical bypass includes a bus bar, and each bus bar is coupled to the free end of its corresponding electrical insulator.

14. The system of claim 13, wherein each electrical bypass further comprises electrical cables electrically connected to opposite ends of its corresponding bus bar, and wherein the bus bars and cables are electrically connectable around their corresponding switches so as to electrically bypass the switch.

15. The system of claim 1, wherein the robotic arm is telescopically extendable in length.

16. The system of claim 1, wherein the boom adapter arm and the robotic arm jib are mounted end-to-end to one another to form a swing arm and the included angle between the boom and the boom adapter arm is in the range of 60-120 degrees.

17. The system of claim 16, wherein the swing arm is 12 feet long.

18. The system of claim 16, wherein the swing arm and the robotic arm lie substantially in a common plane.

19. The system of claim 16, wherein the swing arm is substantially linear.

20. The system of claim 16, wherein the boom adapter arm and the robotic arm jib are of substantially equal length.

21. The system of claim 18, wherein the robotic arm is positionable by the actuator so as to rotate the robotic arm in the common plane.

22. A robotic arm system including a robotic arm and an apparatus for mounting the robotic arm in an inverted position from a free end of a crane or truck boom to suspend a free end of an at least one elongate electrical insulator on the robotic arm above and over an energized electrical component, the system comprising:

a) a releasably lockable hinge coupler having a pivot linkage, wherein the hinge coupler is adapted for mounting to the free end of the boom;

b) an elongate swing arm having opposite first and second ends, wherein the swing arm is pivotally mounted, at the first end thereof, on the pivot linkage for releasably lockable pivoting of the swing arm about the pivot linkage relative to the hinge coupler so as to be selectively oriented downwardly relative to a long axis of the boom;

c) a robotic arm pivotally mounted to the second end of the swing arm so as to be selectively rotatable to a horizontal orientation; and d) an actuator configured to cooperate between the swing arm and the robotic arm to selectively rotate the robotic arm relative to the swing arm;

wherein, in operation, when the swing arm is mounted so as to extend downwardly from the pivot linkage, and so as to be spaced away by an included angle from the free end of the boom, whereby the robotic arm is also spaced away from the boom to provide working clearance and minimum approach distance between the boom and the robotic arm when the robotic arm is in proximity to the energized electrical component, the at least one electrical insulator on the robotic arm is oriented vertically downwardly from the robotic arm to position the free end of the at least one electrical insulator above and over the electrical component.

23. A method of using the robotic arm system of claim 22, the method comprising the steps of:

a) with the crane or truck boom retracted and lowered, mounting the hinge coupler onto the end of the boom and mounting the swing arm onto the hinge coupler, b) adjusting the angle of the swing arm into its operational position relative to the boom, and mounting the inverted robotic arm to the free end of the swing arm so that the at least one electrical insulator on the robotic arm depends downwardly, c) coupling a lower end of the at least one electrical insulator to corresponding electrical bypasses, d) elevating the boom, swing arm, robotic arm and electrical bypasses mounted there under so as to position the bypasses over electrical components needing repair or maintenance, e) connecting the bypasses so as to electrically bypass the electrical components, f) de-energizing the electrical components for repair, maintenance or replacement.

24. The method of claim 23 wherein said electrical bypasses include a bus bar and wherein the bus bar is coupled to the lowermost free end of said at least one electrical insulator.

25. The method of claim 24 wherein said electrical bypasses further comprise electrical cables electrically connected to opposite ends of said bus bar, whereby said bus bar and cables are positionable over, and electrically connectable around an energized electrical component so as to electrically bypass said component for servicing or replacement of said component once de-energized.

26. The method of claim 25 wherein said component is a switch.

27. The method of claim 23 wherein said at least one electrical insulator is a plurality of electrical insulators.

28. The method of claim 27 wherein said plurality of electrical insulators includes one or more insulator for each phase of three phase conductors.

29. The method of claim 28 wherein said electrical bypasses include a bus bar coupled to the lowermost free end of said plurality of electrical insulators.

30. The method of claim 29 wherein said bypasses further comprise electrical cables electrically connected to opposite ends of said bus bar, whereby said bus bar and cables are positionable over, and electrically connectable around an energized electrical component so as to electrically bypass said component for servicing or replacement of said component once de-energized.

\* \* \* \* \*